(12) United States Patent
Murata et al.

(10) Patent No.: US 11,412,151 B2
(45) Date of Patent: Aug. 9, 2022

(54) VEHICLE IMAGING DEVICE, IMAGE PROCESSING METHOD, AND IMAGE PROCESSING PROGRAM

(71) Applicant: JVCKENWOOD CORPORATION, Yokohama (JP)

(72) Inventors: Toshitaka Murata, Yokohama (JP); Takashi Himukashi, Yokohama (JP); Yu Hojo, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/200,158

(22) Filed: Mar. 12, 2021

(65) Prior Publication Data
US 2021/0314475 A1 Oct. 7, 2021

(30) Foreign Application Priority Data
Apr. 2, 2020 (JP) .............................. JP2020-066892

(51) Int. Cl.
*H04N 5/235* (2006.01)
*G06T 5/50* (2006.01)
(Continued)

(52) U.S. Cl.
CPC ............. *H04N 5/2353* (2013.01); *G06T 3/60* (2013.01); *G06T 5/003* (2013.01); *G06T 5/50* (2013.01);
(Continued)

(58) Field of Classification Search
CPC .... H04N 5/2353; H04N 5/76; H04N 5/23238; H04N 5/2355; H04N 5/77; G06T 3/60; G06T 5/003; G06T 5/50; G06T 7/20; G06T 7/70; G06T 2207/20221; G06T 2207/30252; G06T 2207/20201; G06T 2207/20208; G06T 2207/30244; G06T 7/246; G06T 2207/10016; B60R 2300/302; B60R 2300/303; B60R 2300/605; B60R 1/00; G06V 20/56

See application file for complete search history.

(56) References Cited

U.S. PATENT DOCUMENTS

2016/0073020 A1* 3/2016 Matsumoto ............. G06T 7/231
348/222.1

FOREIGN PATENT DOCUMENTS

JP 2018-195348 A 12/2018

* cited by examiner

*Primary Examiner* — Girumsew Wendmagegn
(74) *Attorney, Agent, or Firm* — Nath, Goldberg & Meyer; Jerald L. Meyer

(57) ABSTRACT

A measurement unit measures a first generation time of a first vanishing point of a plurality of radially diverging motion vectors generated in a front image region and a second generation time of a second vanishing point of a plurality of converging motion vectors generated in the front image region within a predetermined period of time in a state in which an image rotation unit adjusts positions of the front image region and a rear image region in a circumferential direction. The image rotation unit keeps the positions of the front image region and the rear image region in the circumferential direction when the first generation time measured by the measurement unit is longer than the second generation time, and rotates the captured image to reverse the front image region and the rear image region when the first generation time is not longer than the second generation time.

27 Claims, 29 Drawing Sheets

(51) Int. Cl.
*G06T 3/60* (2006.01)
*G06T 7/70* (2017.01)
*G06T 5/00* (2006.01)
*H04N 5/76* (2006.01)
*G06T 7/20* (2017.01)

(52) U.S. Cl.
CPC .............. *G06T 7/20* (2013.01); *G06T 7/70* (2017.01); *H04N 5/76* (2013.01); *G06T 2207/20221* (2013.01); *G06T 2207/30252* (2013.01)

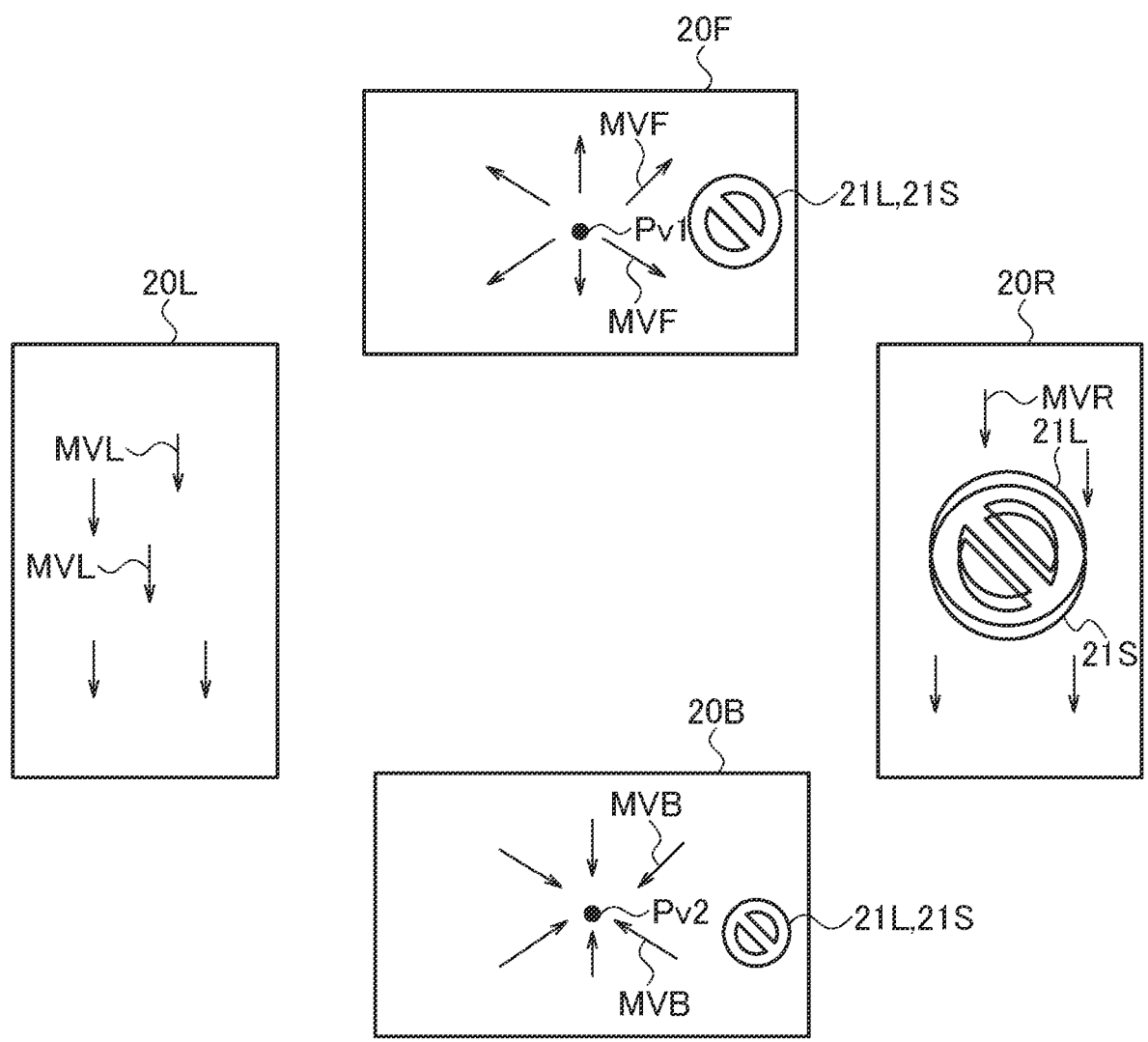

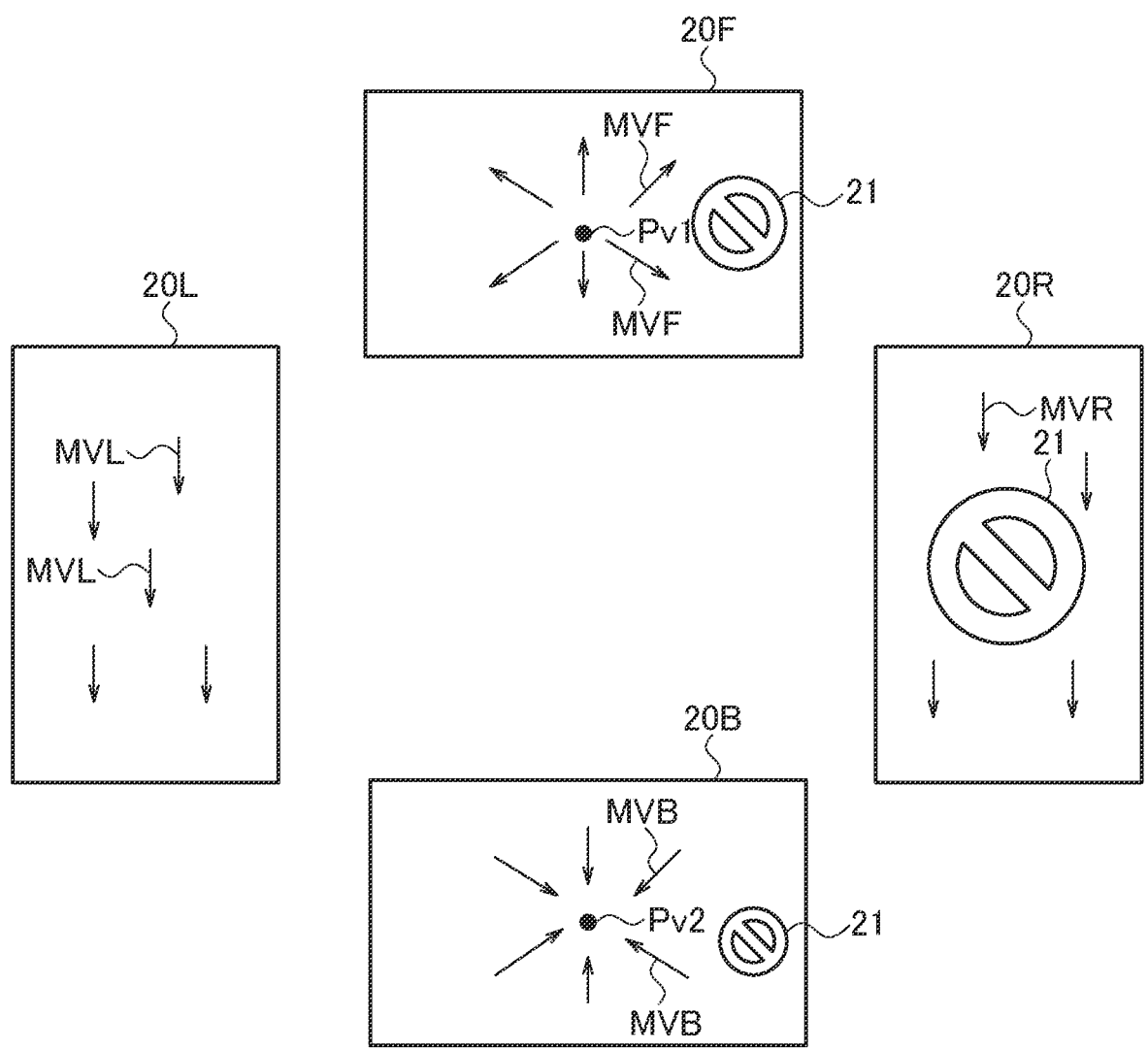

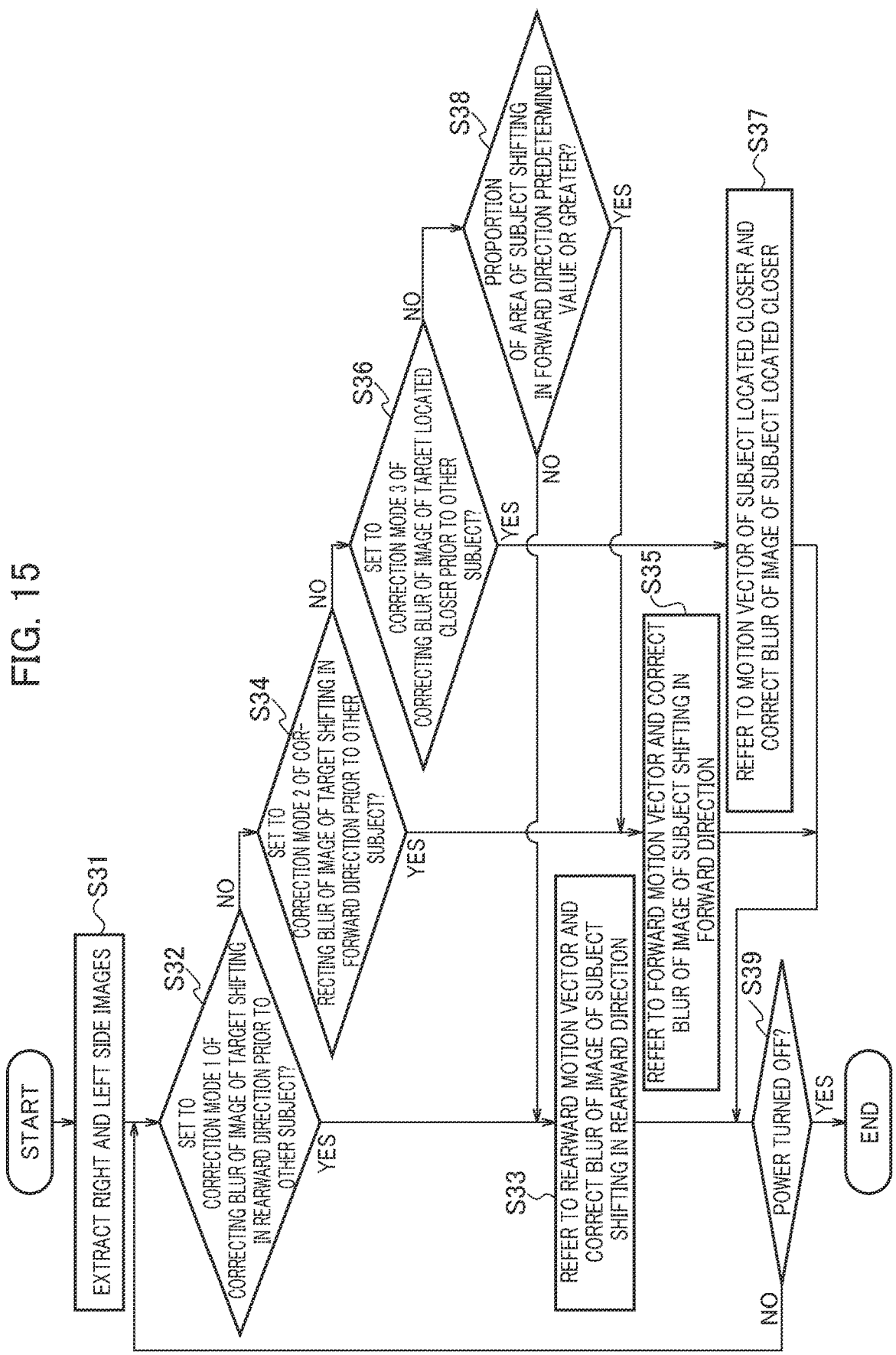

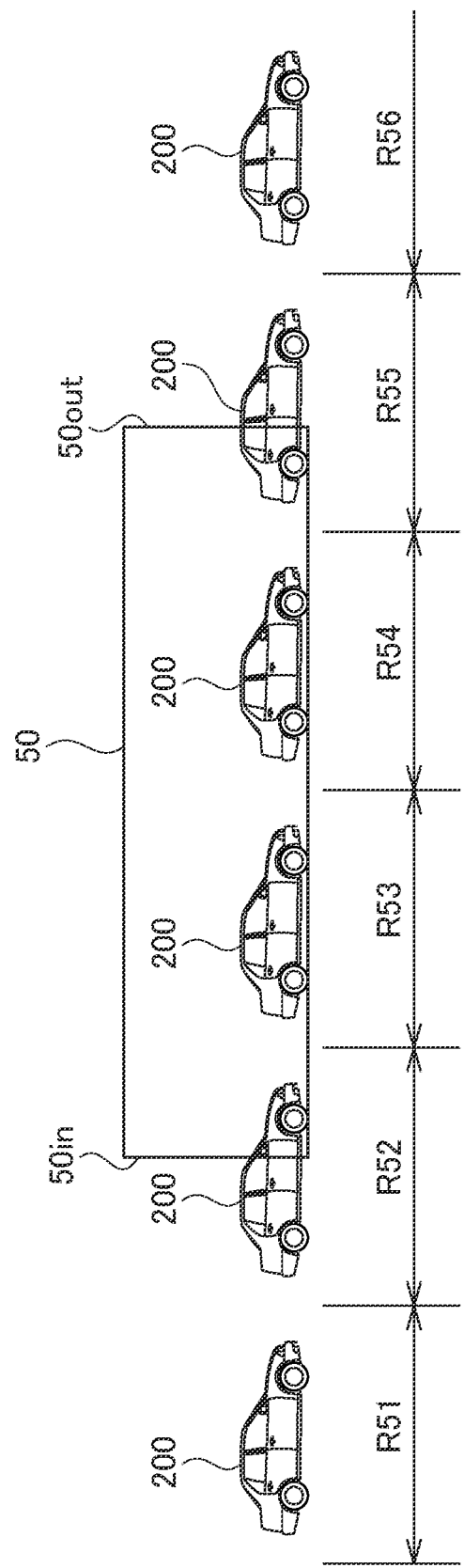

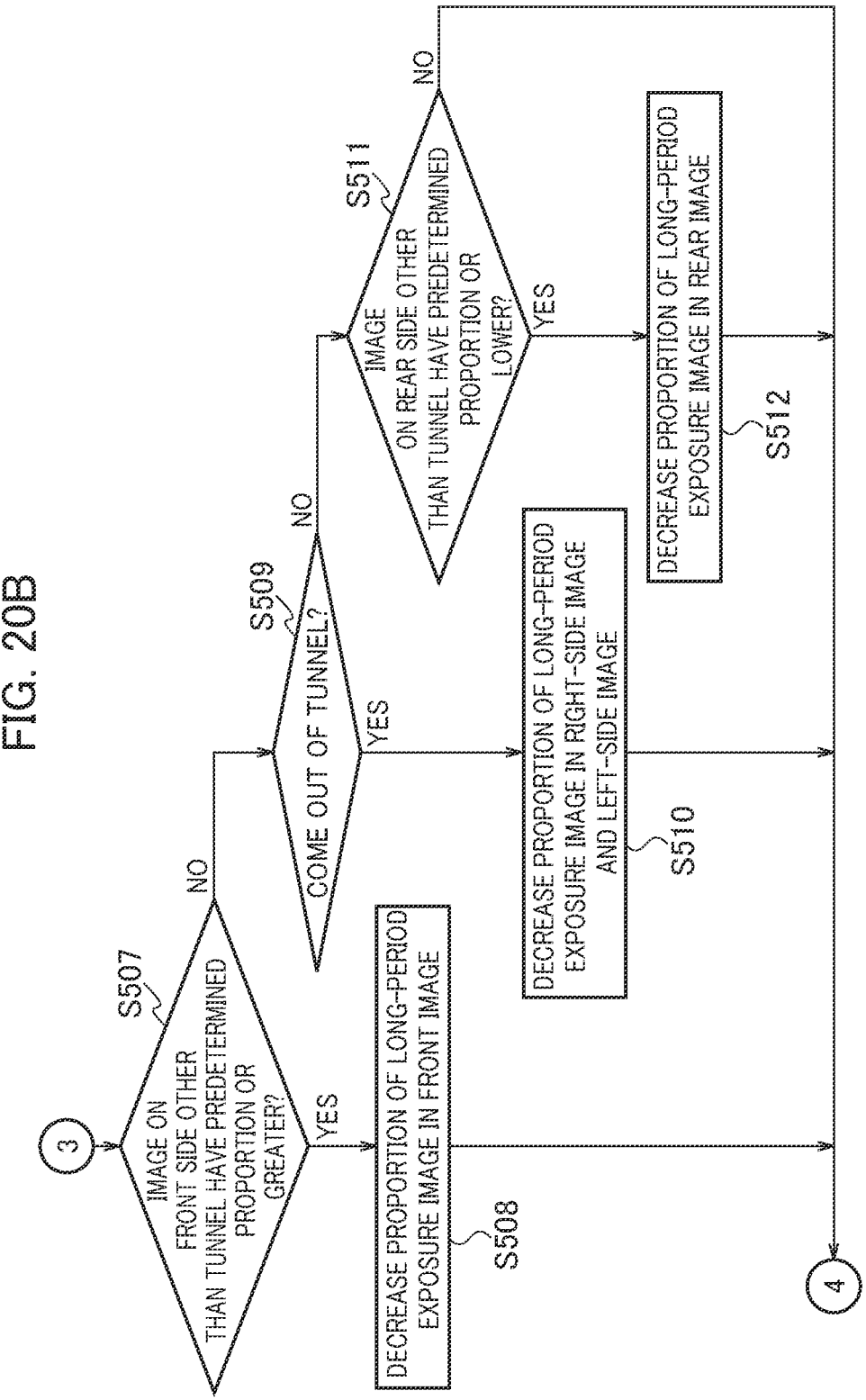

VEHICLE IMAGING DEVICE, IMAGE PROCESSING METHOD, AND IMAGE PROCESSING PROGRAM

BACKGROUND

The present disclosure relates to a vehicle imaging device, an image processing method, and an image processing program for imaging subjects through 360 degrees on the front, rear, right, and left sides around a vehicle using a fisheye lens.

Japanese Unexamined Patent Application Publication No. 2018-195348 discloses a vehicle imaging device (called a drive recorder) for imaging subjects through 360 degrees on the front, rear, right, and left sides around a vehicle using a fisheye lens.

SUMMARY

The vehicle imaging device as described above analyzes a 360-degree captured image to determine the front and rear sides of the vehicle, and extracts regional images corresponding to a front image region, a rear image region, and right and left side image regions. The conventional vehicle imaging device sometimes makes an error in determination on the front and rear sides of the vehicle, which leads to a wrong extraction of the respective regional images.

A first aspect of one or more embodiments provides a vehicle imaging device provided in a vehicle, the device including: a motion vector detector configured to detect motion vectors of a captured image of a subject imaged through 360 degrees by an imaging unit to which a light enters via a fisheye lens; a front-rear-right-left determination unit configured to determine front and rear sides and right and left sides of the vehicle in accordance with the captured image and determine positions of at least a front image region and a rear image region in a circumferential direction in the captured image; an image rotation unit configured to rotate the captured image about a first vanishing point of a plurality of radially diverging motion vectors among the motion vectors detected by the motion vector detector immediately after the vehicle starts moving, and adjust the positions of the front image region and the rear image region in the circumferential direction; and a measurement unit configured to measure a first generation time of the first vanishing point generated in the front image region and a second generation time of a second vanishing point of a plurality of converging motion vectors generated in the front image region within a predetermined period of time in a state in which the image rotation unit adjusts the positions of the front image region and the rear image region in the circumferential direction, wherein the image rotation unit is configured to keep the positions of the front image region and the rear image region in the circumferential direction when the first generation time measured by the measurement unit is longer than the second generation time, and rotate the captured image to reverse the front image region and the rear image region when the first generation time is not longer than the second generation time, the vehicle imaging device further comprises an image extraction unit configured to extract regional images of the front image region and the rear image region kept or reversed by the image rotation unit in the captured image to generate a front image and a rear image.

A second aspect of one or more embodiments provides an image processing method for a vehicle imaging device provided in a vehicle, the method including: detecting motion vectors of a captured image of a subject imaged through 360 degrees by an imaging unit to which a light enters via a fisheye lens; determining front and rear sides and right and left sides of the vehicle in accordance with the captured image and determining positions of at least a front image region and a rear image region in a circumferential direction in the captured image; rotating the captured image about a first vanishing point of a plurality of radially diverging motion vectors among the motion vectors detected immediately after the vehicle starts moving, and adjusting the positions of the front image region and the rear image region in the circumferential direction; measuring a first generation time of the first vanishing point generated in the front image region and a second generation time of a second vanishing point of a plurality of converging motion vectors generated in the front image region within a predetermined period of time in a state of adjusting the positions of the front image region and the rear image region in the circumferential direction; keeping the positions of the front image region and the rear image region in the circumferential direction when the first generation time measured is longer than the second generation time; rotating the captured image to reverse the front image region and the rear image region when the first generation time measured is not longer than the second generation time; and extracting regional images of the front image region and the rear image region kept when the first generation time measured is longer than the second generation time or reversed when the first generation time measured is not longer than the second generation time in the captured image to generate a front image and a rear image.

A third aspect of one or more embodiments provides an image processing program stored in a non-transitory storage medium causing a computer installed in a vehicle imaging device provided in a vehicle to execute the steps of: detecting motion vectors of a captured image of a subject imaged through 360 degrees by an imaging unit to which a light enters via a fisheye lens; determining front and rear sides and right and left sides of the vehicle in accordance with the captured image and determining positions of at least a front image region and a rear image region in a circumferential direction in the captured image; rotating the captured image about a first vanishing point of a plurality of radially diverging motion vectors among the motion vectors detected immediately after the vehicle starts moving, and adjusting the positions of the front image region and the rear image region in the circumferential direction; measuring a first generation time of the first vanishing point generated in the front image region and a second generation time of a second vanishing point of a plurality of converging motion vectors generated in the front image region within a predetermined period of time in a state of adjusting the positions of the front image region and the rear image region in the circumferential direction; keeping the positions of the front image region and the rear image region in the circumferential direction when the first generation time measured is longer than the second generation time; rotating the captured image to reverse the front image region and the rear image region when the first generation time measured is not longer than the second generation time; and extracting regional images of the front image region and the rear image region kept when the first generation time measured is longer than the second generation time or reversed when the first generation time measured is not longer than the second generation time in the captured image to generate a front image and a rear image.

BRIEF DESCRIPTION OF THE DRAWINGS

FIG. 11 is a schematic view showing a blur of an image of a subject in a right-side image or a left-side image in a vehicle imaging device according to a second embodiment.

FIG. 12 a schematic view showing a state in which the blur of the image of the subject in the right-side image or the left-side image has been corrected in the vehicle imaging device according to a second embodiment.

FIG. 15 is a flowchart showing a process of processing executed in a third embodiment.

FIG. 19 is a schematic view showing a state of the vehicle when reaching a tunnel, entering the tunnel, traveling in the tunnel, and coming out of the tunnel.

FIG. 20B is a flowchart showing a part of the processing executed in a fifth embodiment continued from the processing shown in FIG. 20A.

DETAILED DESCRIPTION

Hereinafter, a vehicle imaging device, an image processing method, and an image processing program according to each embodiment will be described with reference to the accompanying drawings.

First Embodiment

Figure 1:
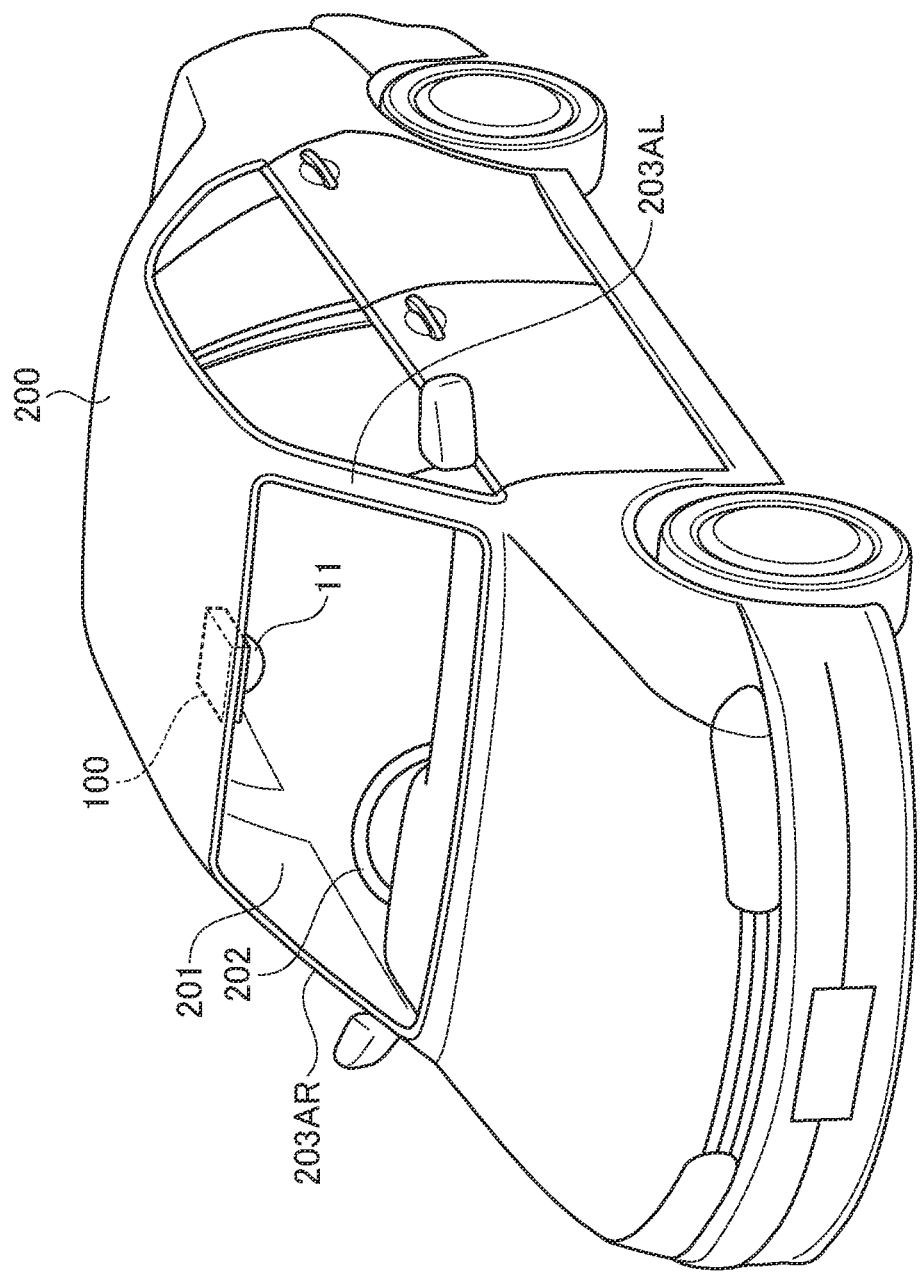
FIG. 1 is a perspective view showing an example of a vehicle equipped in a compartment with a vehicle imaging device according to each embodiment.

As illustrated in FIG. 1, a vehicle imaging device 100 is installed at au upper part of a front shield 201 of a vehicle 200. The vehicle imaging device 100 is a drive recorder. The installation position of the vehicle imaging device 100 is not limited to the front shield 201. The vehicle imaging device 100 includes a fisheye lens 11 that captures images through 360 degrees on the front, rear, right, and left sides of the vehicle 200 including an image of a compartment as viewed from above.

Figure 2:
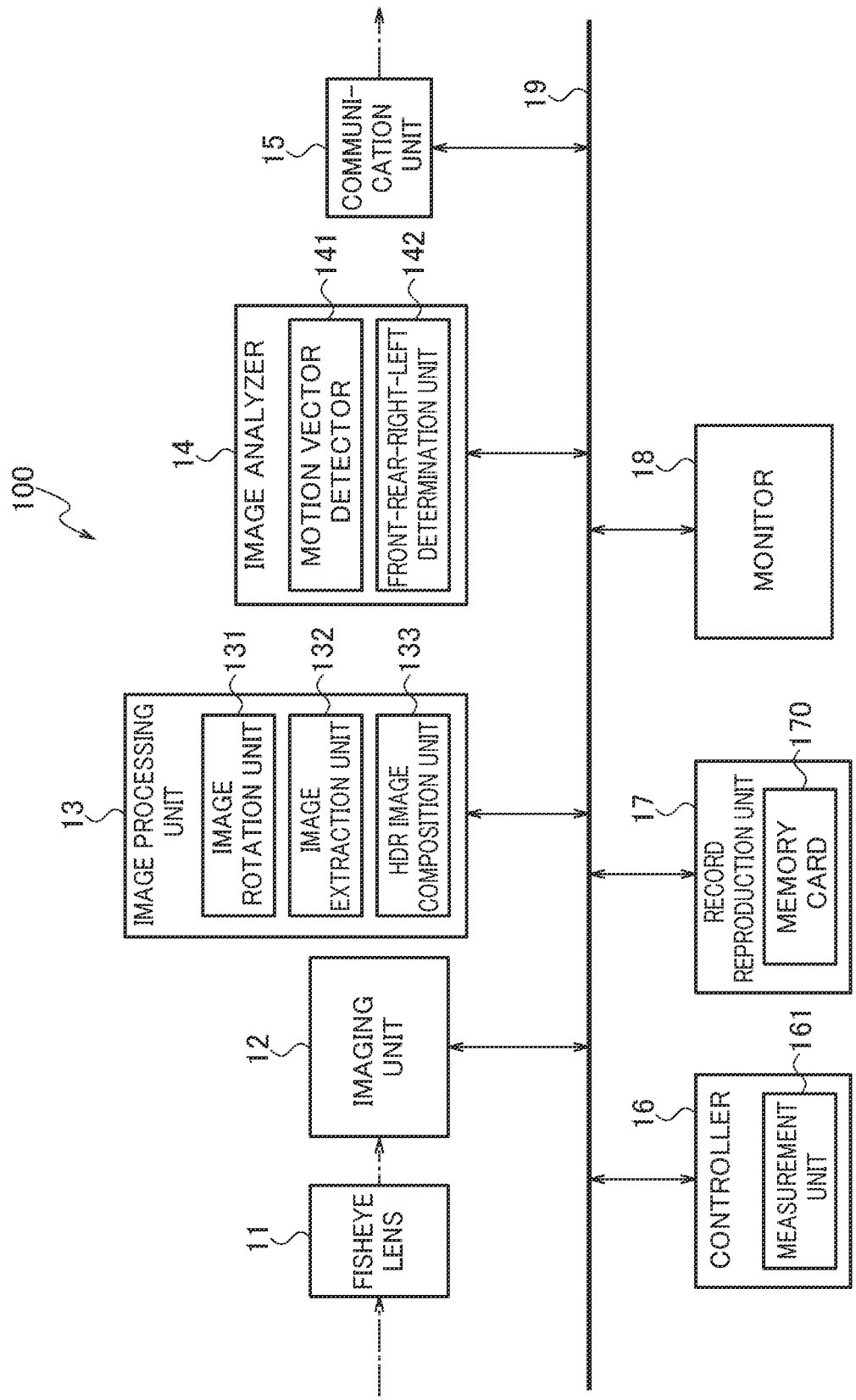
FIG. 2 is a block diagram showing a specific configuration example of the vehicle imaging device according to each embodiment.

FIG. 2 is a view showing a specific configuration example of the vehicle imaging device 100. The vehicle imaging device 100 includes the fisheye lens 11, an imaging unit 12, an image processing unit 13, an image analyzer 14, a communication unit 15, a controller 16, a record reproduction unit 17, and a monitor 18. The imaging unit 12 to the monitor 18 are connected to each other via a bus 19.

The image processing unit 13 includes an image rotation unit 131, an image extraction unit 132, and a high-dynamic-range image composition unit 133. The term "high-dynamic-range" is abbreviated below to "HDR". The image analyzer 14 includes a motion vector detector 141 and a front-rear-right-left determination unit 142. The controller 16 includes a measurement unit 161. The record reproduction unit 17 includes a removable memory card 170 as a recording medium (a storage medium). The recording medium is not limited to the memory card.

The imaging unit 12 includes an imaging element which is a charge coupled device (CCD) or a complementary metal oxide semiconductor (CMOS). The imaging unit 12 generates a captured image (an all-around image) of a subject imaged through 360 degrees with an incident light indicated by the one-dash chain line in FIG. 2 entering from the subject via the fisheye lens.

In a case in which the vehicle imaging device 100 generates a captured image with 60 frames/second, the imaging unit 12 images a subject with 120 frames/second. The imaging unit 12 exposes one of the two frames adjacent to each other for a first exposure time (a long period), and exposes the other frame for a second exposure time (a short period) shorter than the first exposure time. The imaging unit 12 includes an electronic shutter, so as to optionally vary the exposure time according the control by the controller 16. The imaging unit 12 generates a long-period exposure image and a short-period exposure image as a 360-degree captured image.

The respective 360-degree long-period exposure image and short-period exposure image generated by the imaging unit 12 are supplied to the image processing unit 13 and the image analyzer 14.

Figure 3:
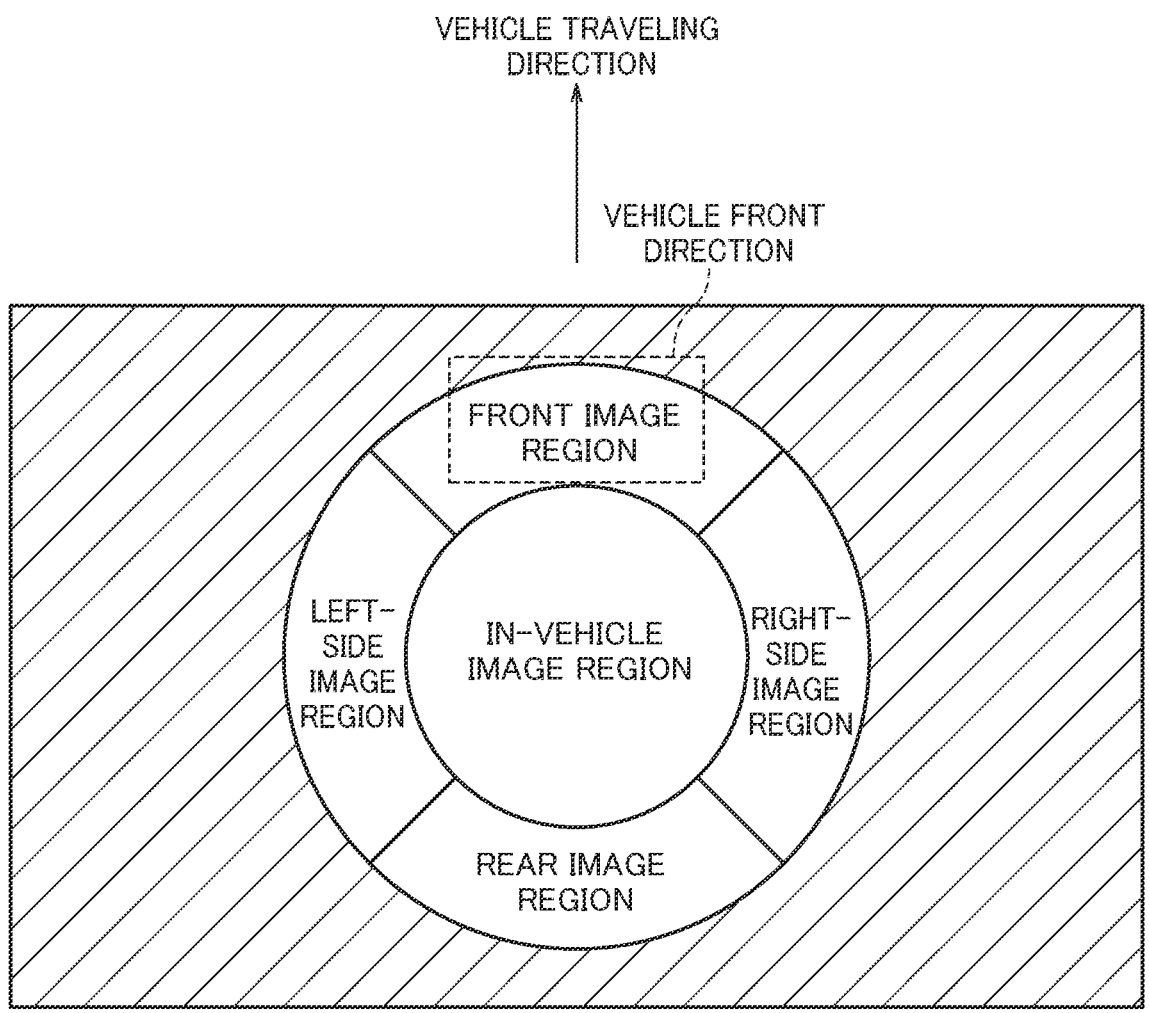
FIG. 3 is a schematic view showing a 360-degree captured image generated by an imaging unit of the vehicle imaging device according to each embodiment, and showing a state of correctly determining the forward direction of the vehicle.

As schematically illustrated in FIG. 3, the 360-degree captured image generated by the imaging unit 12 is composed of a circular pixel region as a part of a rectangular pixel region of the imaging element. The captured image composed of the circular pixel region includes an in-vehicle image region as viewed from above the compartment of the vehicle 200, and a front image region, a rear image region, a right-side image region, and a left-side image region around the in-vehicle image region. Since the 360-degree captured image is obtained such that a subject is imaged via the fisheye lens 11, the images in the front image region, the rear image region, the right-side image region, and the left-side image region are greatly distorted.

The positions of the front image region, the rear image region, the right-side image region, and the left-side image region in the circumferential direction as illustrated in FIG. 3 are an example for illustration purposes. The determination of which direction in the circumferential direction is set to the front image region, the rear image region, the right-side image region, or the left-side image region is finally made in accordance with motion vectors detected by the motion vector detector 141 and the determination made by the front-rear-right-left determination unit 142. The front image region illustrated in FIG. 3 is presumed to be an image in a state in which the forward direction of the vehicle 200 is correctly determined and is thus the actual forward direction as indicated by the rectangle of the dashed line corresponding to the direction in which the front shield 201 of the vehicle 200 is located.

When the vehicle imaging device 100 is activated, the HDR image composition unit 133 combines the respective 360-degree images of the long-period exposure image and the short-period exposure image to generate a combined image (a HDR combined image) with 60 frames/second in which the dynamic range is expanded. The HDR image composition unit 133 combines the long-period exposure image and the short-period exposure image in a predetermined ratio depending on the brightness of the image analyzed by the image analyzer 14 in accordance with the control by the controller 16. The HDR image composition unit 133, however, is not necessarily used in a first embodiment.

The front-rear-right-left determination unit 142 determines the front and rear sides and the right and left sides of the vehicle 200 based on the combined image generated by the HDR image composition unit 133 in accordance with the control by the controller 16, and provisionally determines the positions of the front image region, the rear image region, the right-side image region, and the left-side image region in the circumferential direction. The reason for the provisional determination of the positions in the front, rear, right, and left directions is that the front, rear, right, and left directions can be corrected by the processing described below.

The front-rear-right-left determination unit 142 determines the forward direction of the vehicle 200 based on an image of a steering wheel 202 of the vehicle 200, for example. The state of the image of the steering wheel 202, however, can vary depending on the mount position, the mount angle, and the direction of the vehicle imaging device 100. The term "mount position" refers to a position at which the vehicle imaging device 100 is arranged either ahead of the steering wheel 202 or behind the steering wheel 202. The term "mount angle" refers to an angle at which the imaging center of the vehicle imaging device 100 makes with respect to the vertical direction. The term "direction" refers to a direction in which the vehicle imaging device 100 is directed in the circumferential direction.

The front-rear-right-left determination unit 142 would make a wrong determination regarding the forward direction of the vehicle 200 depending on the image of the steering wheel 202. The front-rear-right-left determination unit 142 may determine the forward direction of the vehicle 200 in accordance with an image other than the steering wheel 202 of the vehicle 200. The front-rear-right-left determination unit 142, however, still could make a wrong determination regarding the forward direction of the vehicle 200.

Figure 4:
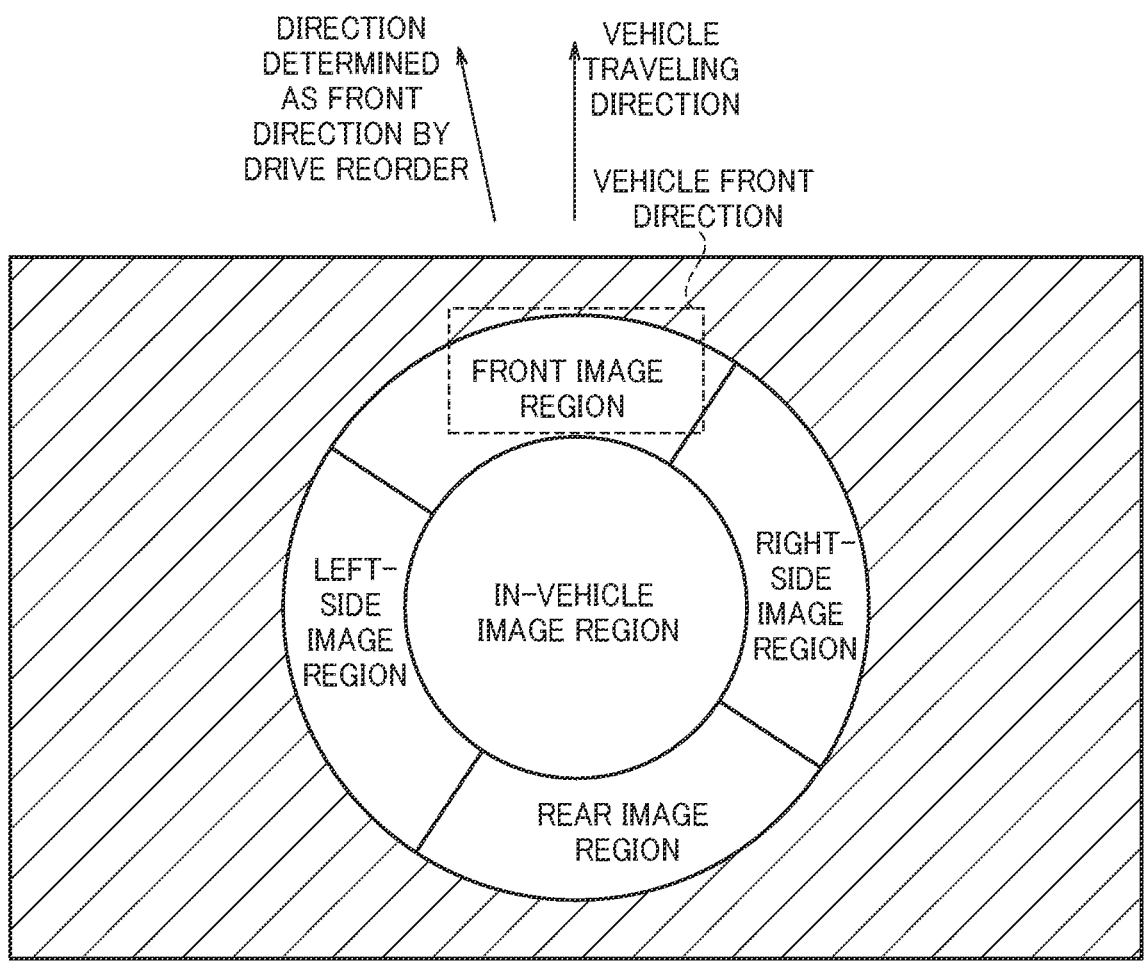
FIG. 4 is a schematic view showing the 360-degree captured image generated by the imaging unit of the vehicle imaging device according to each embodiment, and showing an example of a state of wrongly determining the forward direction of the vehicle.

A case is assumed in which the front-rear-right-left determination unit 142 wrongly determines, as the forward direction, a direction deviating by a predetermined angle in the leftward direction from the traveling direction of the vehicle 200, as illustrated in FIG. 4. If the front-rear-right-left determination unit 142 having determined the wrong forward direction determines the positions of the front image region, the rear image region, the right-side image region, and the left-side image region in the circumferential direction, the front image region does not conform to the image showing the actual forward direction of the vehicle 200 as indicated by the rectangle of the dashed line.

FIG. 4 illustrates the case in which the front image region deviates by a predetermined angle in the leftward direction from the traveling direction of the vehicle 200. The front-rear-right-left determination unit 142 could wrongly determine the rear side as the front side, or determine the right side or the left side as the front side depending on the mount position of the vehicle imaging device 100, making a wrong determination regarding the front image region as a position in the circumferential direction completely different from the front side of the vehicle 200.

The image rotation unit 131 of the image processing unit 13 can rotate the 360-degree image in accordance with the control by the controller 16 as described below. The image extraction unit 132 extracts the respective regional images based on the positions of the front image region, the rear image region, the right-side image region, and the left-side image region in the circumferential direction determined by the front-rear-right-left determination unit 142 in accordance with the control by the controller 16. The image extraction unit 132 corrects the distortion greatly caused by the fisheye lens 11 in the extracted regional images of the front image region, the rear image region, the right-side image region, and the left-side image region, so as to approximate the view on the respective front, rear, right, and left sides of the vehicle 200 that the person is presumed to actually see.

FIG. 5A to FIG. 5D schematically show examples of a front image 20F, a rear image 20B, a right-side image 20R, and a left-side image 20L obtained such that the image extraction unit 132 extracts the respective regional images to correct the distortion. FIG. 5A to FIG. 5D are views each showing a state in which the front-rear-right-left determination unit 142 wrongly determines the forward direction deviating by a predetermined angle in the leftward direction from the traveling direction of the vehicle 200 while the deviation of the angle is not corrected yet.

Figure 5A:
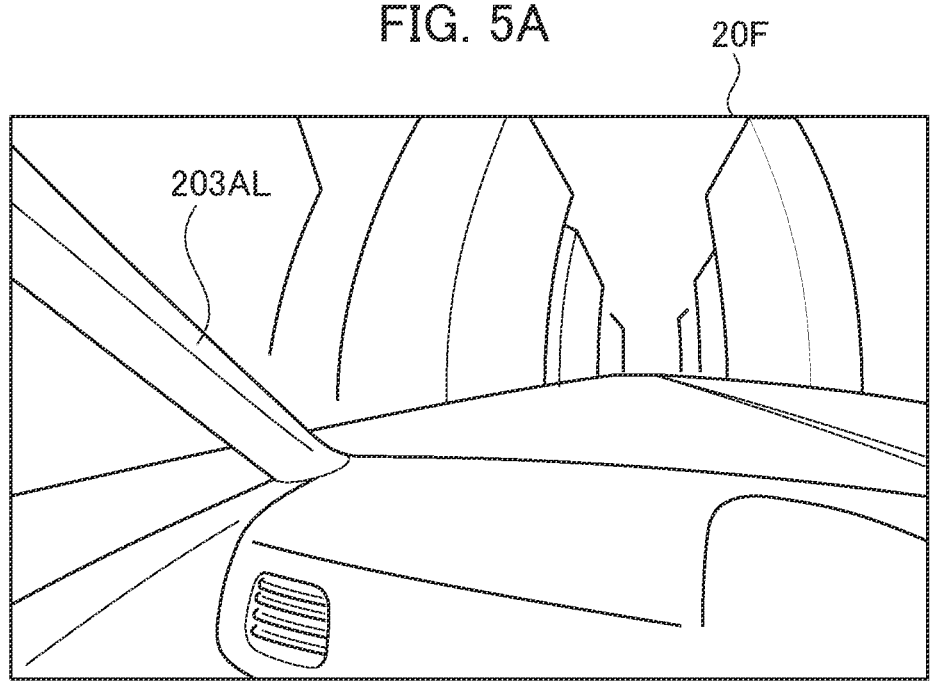
FIG. 5A is a view showing an example of a front image in the state of wrongly determining the forward direction of the vehicle as illustrated in FIG. 4.
Figure 5B:
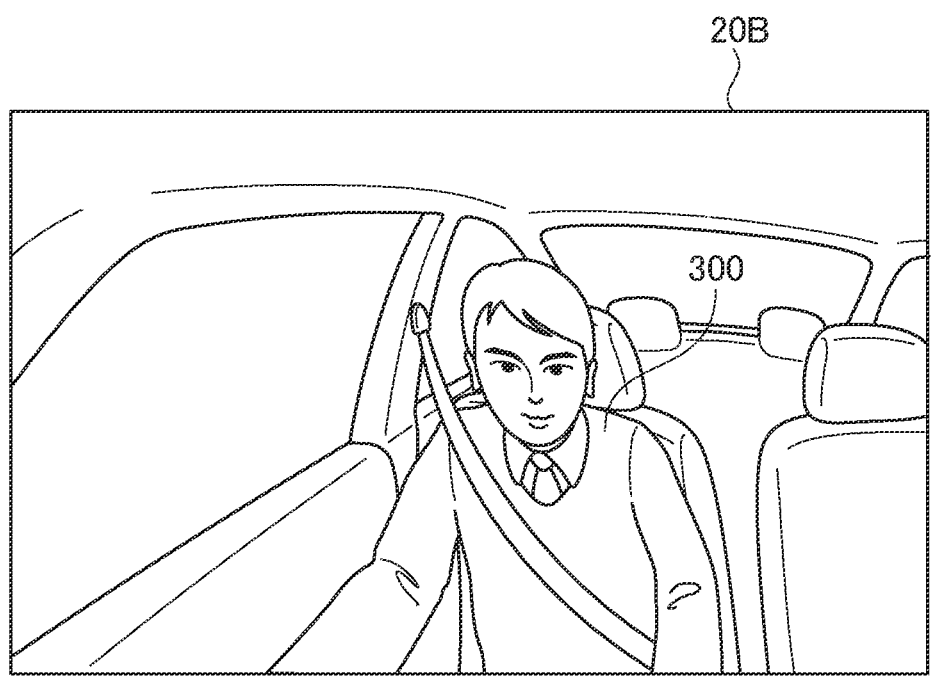
FIG. 5B is a view showing an example of a rear image in the state of wrongly determining the forward direction of the vehicle as illustrated in FIG. 4.
Figure 5C:
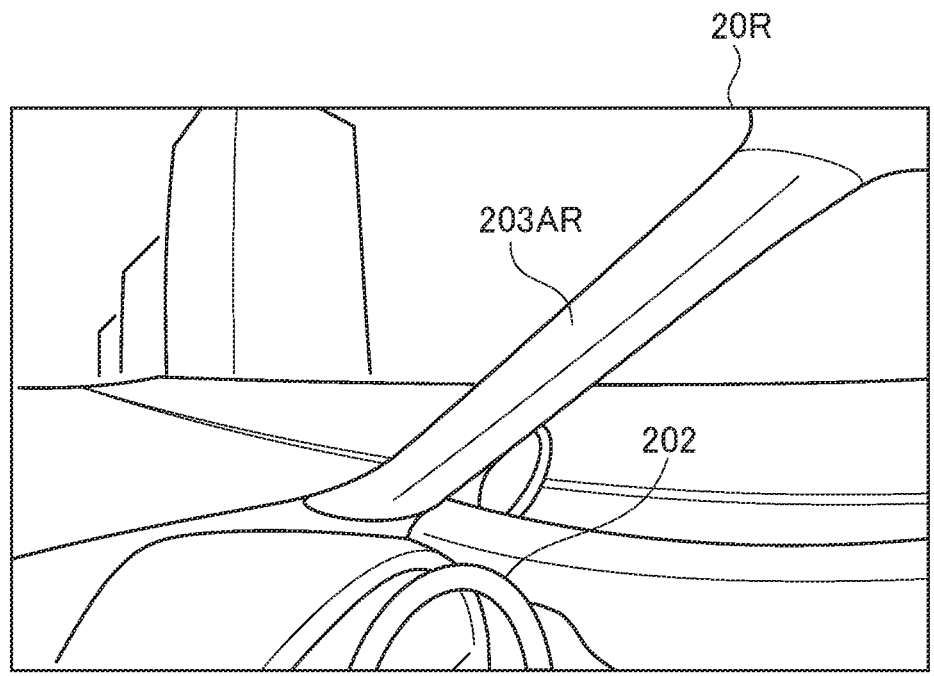
FIG. 5C is a view showing an example of a right-side image in the state of wrongly determining the forward direction of the vehicle as illustrated in FIG. 4.
Figure 5D:
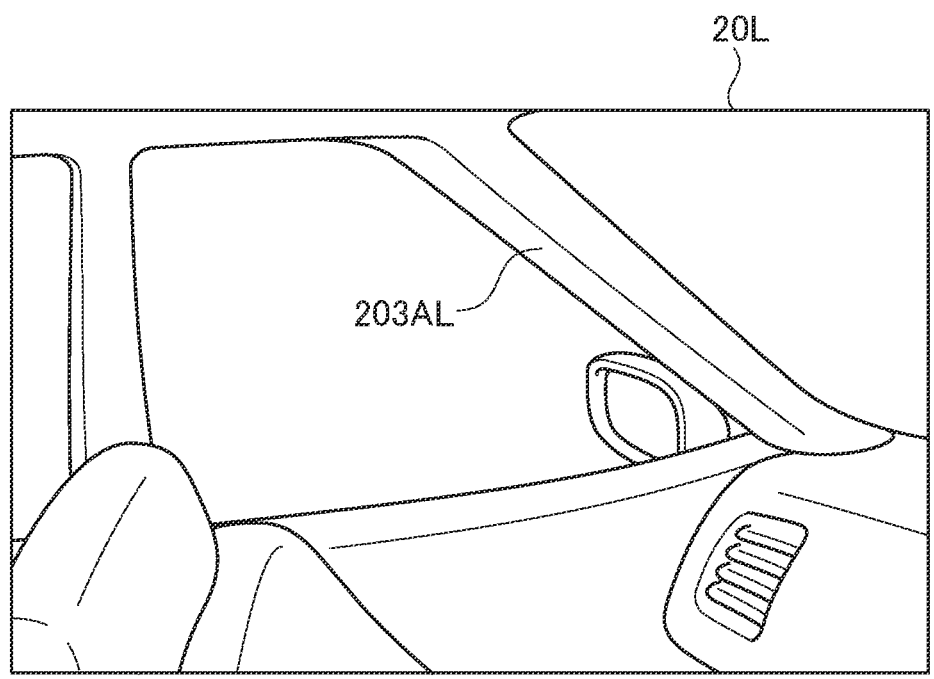
FIG. 5D is a view showing an example of a left-side image in the state of wrongly determining the forward direction of the vehicle as illustrated in FIG. 4.

As illustrated in FIG. 5A, the front image 20F is displaced toward an A-pillar 203AL on the left side. As illustrated in FIG. 5B, the rear image 20B includes the driver 300, and is displaced toward the right side of the vehicle 200. As illustrated in FIG. 5C, the right-side image 20R is displaced toward the front side. As illustrated in FIG. 5D, the left-side image 20L is displaced toward the rear side.

The motion vector detector 141 detects the respective motion vectors in the front image region, the rear image region, the right-side image region, and the left-side image region. The motion vector detector 141 detects the respective motion vectors basically in accordance with the short-period exposure image. The motion vector detector 141 detects the respective motion vectors in accordance with the long-period exposure image when not being able to or hard to detect the motion vectors in accordance with the short-period exposure image. The respective motion vectors in the front image region, the rear image region, the right-side image region, and the left-side image region are referred to below as MVF, MVB, MVR, and MVL.

Figure 6:
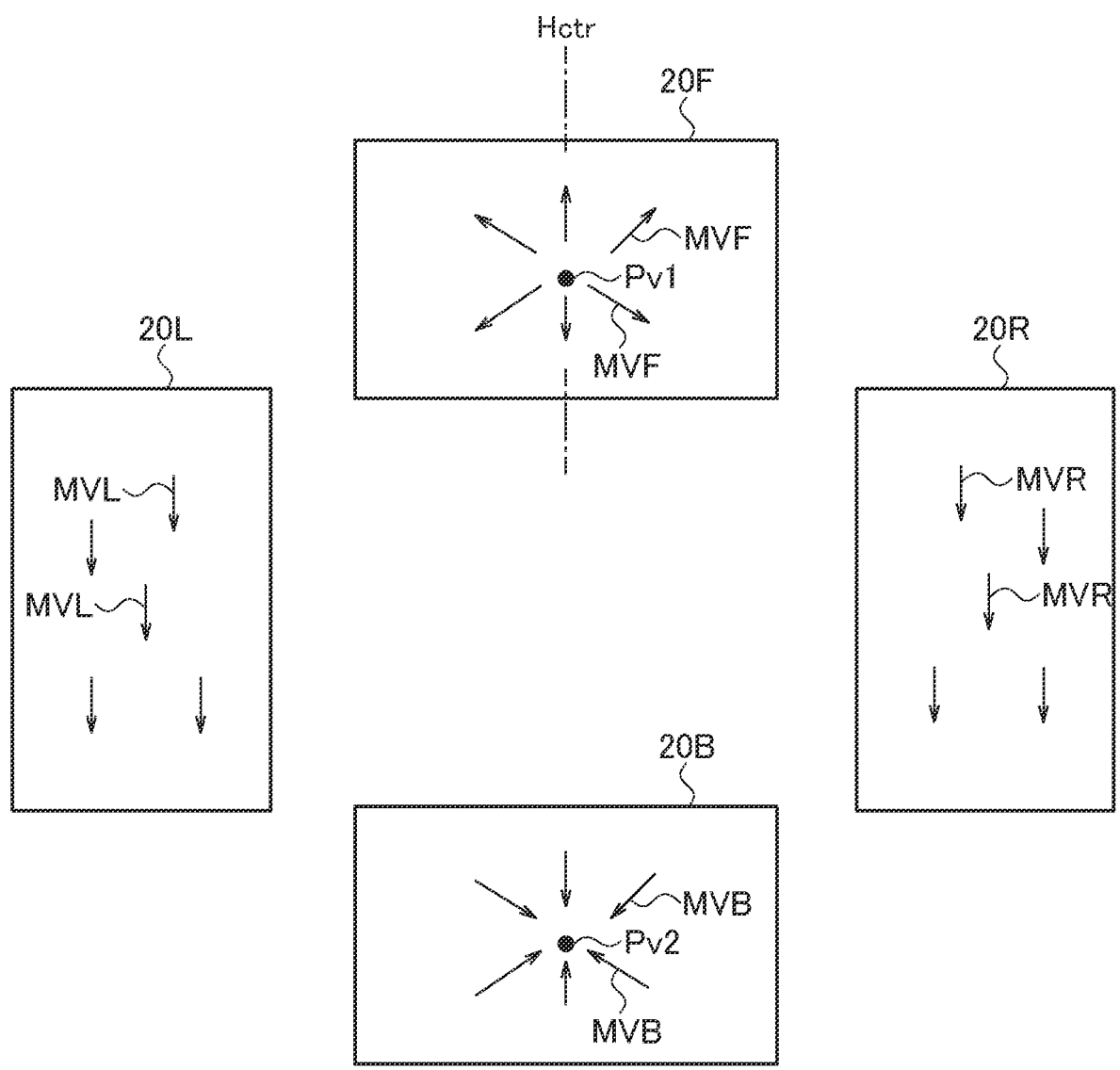
FIG. 6 is a view showing motion vectors detected in the front image, the rear image, the right-side image, and the left-side image in the state of correctly determining the forward direction of the vehicle as illustrated in FIG. 3.
Figure 7:
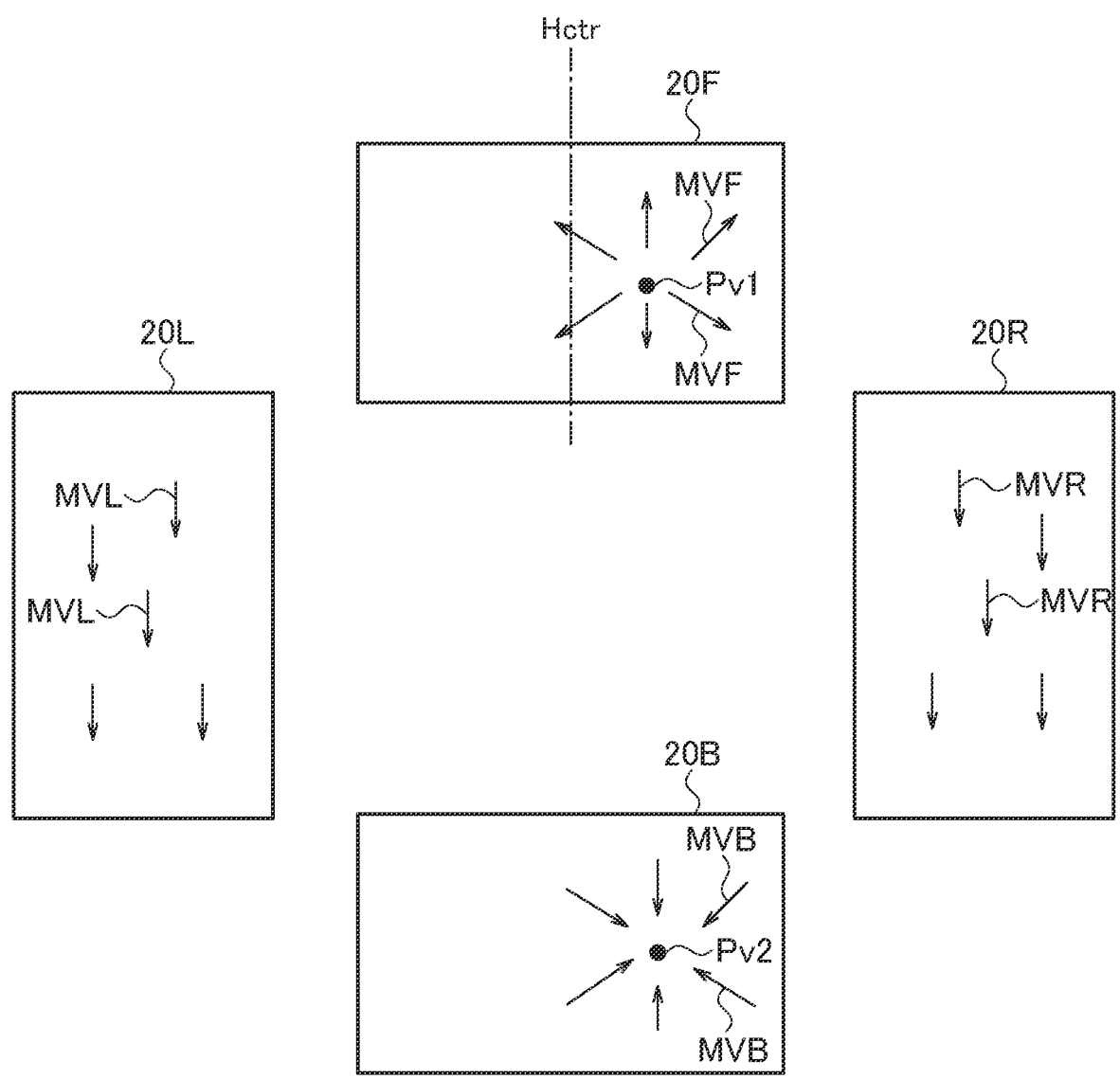
FIG. 7 is a view showing motion vectors detected in the front image, the rear image, the right-side image, and the left-side image in the state of wrongly determining the forward direction of the vehicle as illustrated in FIG. 4.

FIG. 6 illustrates the respective motion vectors MVF, MVB, MVR, and MVL in a state in which the forward direction of the vehicle 200 is correctly determined as illustrated in FIG. 3, and the front image 20F conforms to the actual forward direction of the vehicle 200. FIG. 6 and FIG. 7 described below illustrate the right-side image 20R and the left-side image 20L in a state of being rotated by 90 degrees. The motion vectors MVF in the front image 20F radially diverge about a vanishing point Pv1 at which the divergence starts. The motion vectors MVB in the rear image 20B converge at a vanishing point Pv2. The motion vectors MVR in the right-side image 20R and the motion vectors MVL in the left-side image 20L are directed from the front side to the rear side.

When the front image 20F conforms to the actual forward direction of the vehicle 200, the vanishing point Pv1 in the front image 20F is located substantially in the center Hctr in the right-left direction in the front image 20F.

FIG. 7 illustrates the respective motion vectors MVF, MVB, MVR, and MVL in a state in which the forward direction of the vehicle 200 is wrongly determined as illustrated in FIG. 4, and the front image 20F deviates by a predetermined angle in the leftward direction from the actual forward direction of the vehicle 200. Since the front image 20F does not conform to the actual forward direction of the vehicle 200 but deviates by a predetermined angle in the leftward direction, the vanishing point Pv1 in the front image 20F is located on the right side of the substantial center Hctr in the right-left direction in the front image 20F.

In the vehicle imaging device 100 according to a first embodiment, the image rotation unit 131 rotates the 360-degree captured image illustrated in FIG. 4 in the rightward direction so as to cancel out the displacement between the front image 20F and the actual forward direction of the vehicle 200 to lead the vanishing point Pv1 to conform to the center Hctr. This processing brings the front image region to a state conforming to the actual forward direction of the vehicle 200 as indicated by the rectangle of the dashed line illustrated in FIG. 3 to lead the front image 20F to show the front side.

The image extraction unit 132 extracts the respective regional images of the front image region, the rear image region, the right-side image region, and the left-side image region in the state in which the displacement between the front image 20F and the actual forward direction of the vehicle 200 is canceled out, and generates the front image 20F, the rear image 20B, the right-side image 20R, and the left-side image 20L in which the distortion is corrected.

The front image 20F, the rear image 20B, the right-side image 20R, and the left-side image 20L after the displacement between the front image 20F and the actual forward direction of the vehicle 200 is canceled out lead to the state equivalent to that as illustrated in FIG. 6 in which the forward direction of the vehicle 200 is correctly determined.

The present embodiment is illustrated above with the case in which the image rotation unit 131 cancels out the displacement of the front image 20F deviating by a predetermined angle in the leftward direction from the traveling direction of the vehicle 200, and the image extraction unit 132 then extracts the respective regional images. As described above, the vehicle imaging device 100 could wrongly determine the position in the circumferential direction as the front image region completely different from the front side of the vehicle 200. The vanishing point Pv1 in this case is not present in the front image 20F extracted in accordance with the wrong front image region. The image rotation unit 131 then rotates the 360-degree captured image, so as to lead the vanishing point Pv1 to conform to the center Hctr in the front image 20F if the vanishing point Pv1 is not present in the front image 20F.

As described above, the image rotation unit 131 rotates the 360-degree captured image to cancel out the displacement between the front image 20F and the actual forward direction of the vehicle 200, and the image extraction unit 132 extracts the respective regional images to correct the distortion. The HDR image composition unit 133 then combines the front image 20F, the rear image 20B, the right-side image 20R, and the left-side image 20L in which the distortion in the long-period exposure image and the short-period exposure image is corrected.

The controller 16 controls to store, in the memory card 170, the front image 20F, the rear image 20B, the right-side image 20R, and the left-side image 20L after being combined by the HDR image composition unit 133. The controller 16 may control to store the 360-degree captured images of the long-period exposure image and the short-period exposure image generated by the imaging unit 12 as illustrated in FIG. 4 in the memory card 170. The controller 16 desirably controls to store the front image 20F, the rear image 20B, the right-side image 20R and the left-side image 20L, and also the 360-degree captured images in the memory card 170.

The controller 16 may control the monitor 18 to display a four-divided image in which the front image 20F, the rear image 20B, the right-side image 20R, and the left-side image 20L are arranged in a frame. The controller 16 may control the monitor 18 to display a two-divided image in which the rear image 20B and the right-side image 20R are arranged in a frame. The controller 16 may control the monitor 18 to display only one image (such as the front image 20F) chosen from the front image 20F, the rear image 20B, the right-side image 20R, the left-side image 20L.

The communication unit 15 may externally send the image being captured by the vehicle imaging device 100 or the image recorded in the record reproduction unit 17. The communication unit 15 may be omitted.

Figure 8:
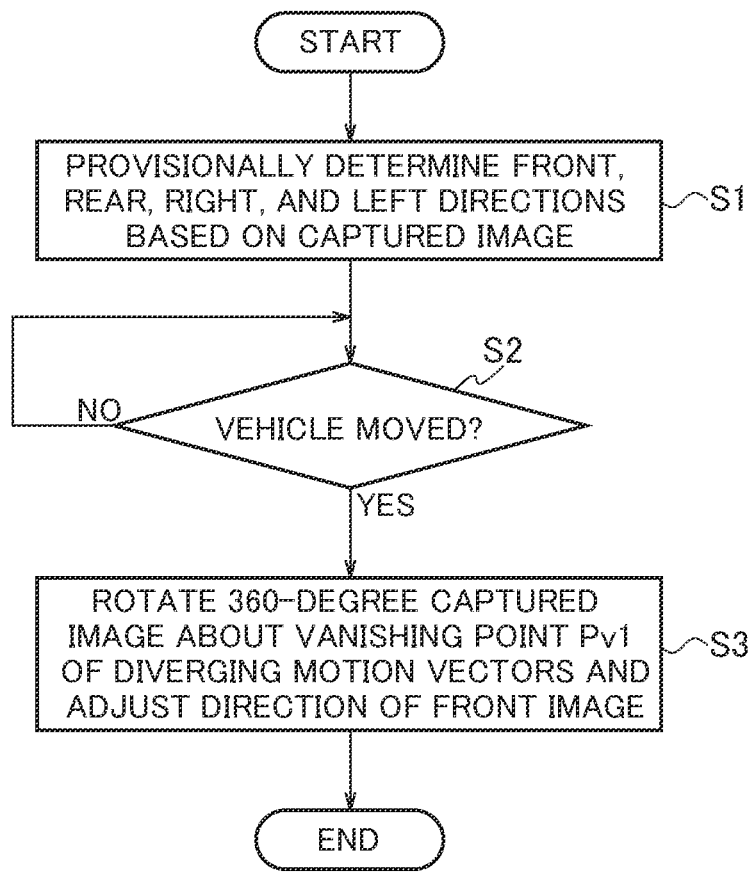
FIG. 8 is a flowchart showing a process of processing executed in a first embodiment.

The processing executed by the image processing unit 13, the image analyzer 14, or the controller 16 is described below with reference to the flowcharts shown in FIG. 8 and FIG. 9. When the processing shown in FIG. 8 is started, the front-rear-right-left determination unit 142 provisionally determines the front, rear, right, and left directions in accordance with the captured image (the combined image output from the HDR image composition unit 133) in step S1.

The image analyzer 14 determines whether the vehicle 200 has moved in step S2. The image analyzer 14 can determine that the vehicle 200 has moved when the motion vector detector 141 detects the motion vectors. The controller 16 may determine whether the vehicle 200 has moved in accordance with the information acquired from a controller area network (CAN) of the vehicle 200.

When the vehicle 200 has not moved yet (NO), the image analyzer 14 (or the controller 16) repeats the processing in step S2. When the vehicle 200 has moved (YES), the image rotation unit 131 rotates the 360-degree captured image about the vanishing point Pv1 of the diverging motion vectors to adjust the direction of the front image 20F in step S3, and temporarily finishes the processing.

Figure 9:
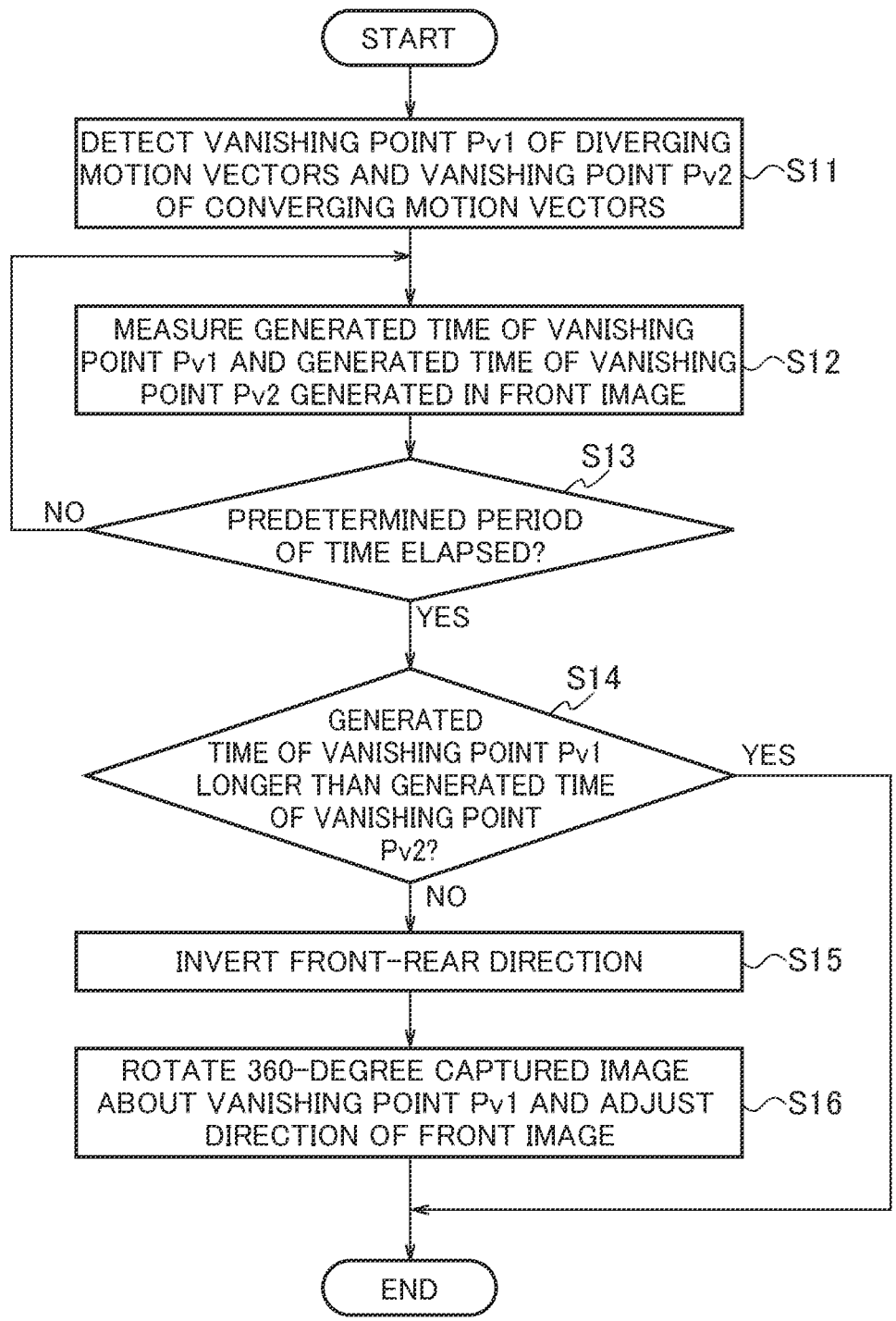
FIG. 9 is a flowchart showing the process of processing executed in a first embodiment continued from the processing of the flowchart shown in FIG. 8.

When the processing shown in FIG. 9 is started, the motion vector detector 141 detects the vanishing point Pv1 of the diverging motion vectors and the vanishing point Pv2 of the converging motion vectors in step S11. The measurement unit 161 measures the generation time of the vanishing point Pv1 and the generation time of the vanishing point Pv2 present in the front image 20F in step S12.

The controller 16 determines whether a predetermined period of time has elapsed in step S13. The predetermined period of time is 10 minutes, for example. When the predetermined period of time has not elapsed yet (NO), the controller 16 repeats the processing in step S13. When the predetermined period of time has elapsed (YES), the controller 16 determines whether the generation time of the vanishing point Pv1 is longer than the generation time of the vanishing point Pv2 in step S14. The term "generation time" refers to a total time within the predetermined period of time.

When the generation time of the vanishing point Pv1 is longer than the generation time of the vanishing point Pv2 in step S14 (YES), the front image 20F in which the direction is adjusted in step S3 shown in FIG. 8 is determined to conform to the actual forward direction of the vehicle 200. The controller 16, the image processing unit 13, and the image analyzer 14 then finish the processing.

The HDR image composition unit 133 in this case combines the front image 20F, the rear image 20B, the right-side image 20R, and the left-side image 20L in each of the long-period exposure image and the short-period exposure image in which the direction is adjusted in step S3, and outputs the combined image.

When the generation time of the vanishing point Pv1 is not longer than the generation time of the vanishing point Pv2 in step S14 (NO), the front image 20F in which the direction is adjusted in step S3 shown in FIG. 8 is determined to be the rear side, instead of the actual front side of the vehicle 200. The reason for this is that the vehicle 200 moves backward in step S2 and the direction of the front image 20F is adjusted about the vanishing point Pv1 temporarily generated in the image on the rear side of the vehicle 200.

The front-rear-right-left determination unit 142 then inverts the front-rear direction in step S15 when the generation time of the vanishing point Pv1 is not longer than the generation time of the vanishing point Pv2 in step S14. In particular, the front-rear-right-left determination unit 142 reverses the front image region and the rear image region, and reverses the right-side image region and the left-side image region. The image rotation unit 131 rotates the 360-degree captured image about the vanishing point Pv1 to adjust the direction of the front image 20F in step S16, and finishes the processing.

The HDR image composition unit 133 in this case combines the front image 20F, the rear image 20B, the right-side image 20R, and the left-side image 20L in each of the long-period exposure image and the short-period exposure image in which the front-rear direction is inverted in step 315 and the direction is adjusted in step S16, and outputs the combined image.

The processing in step S16 is not necessarily, but preferably executed.

Figure 10A:
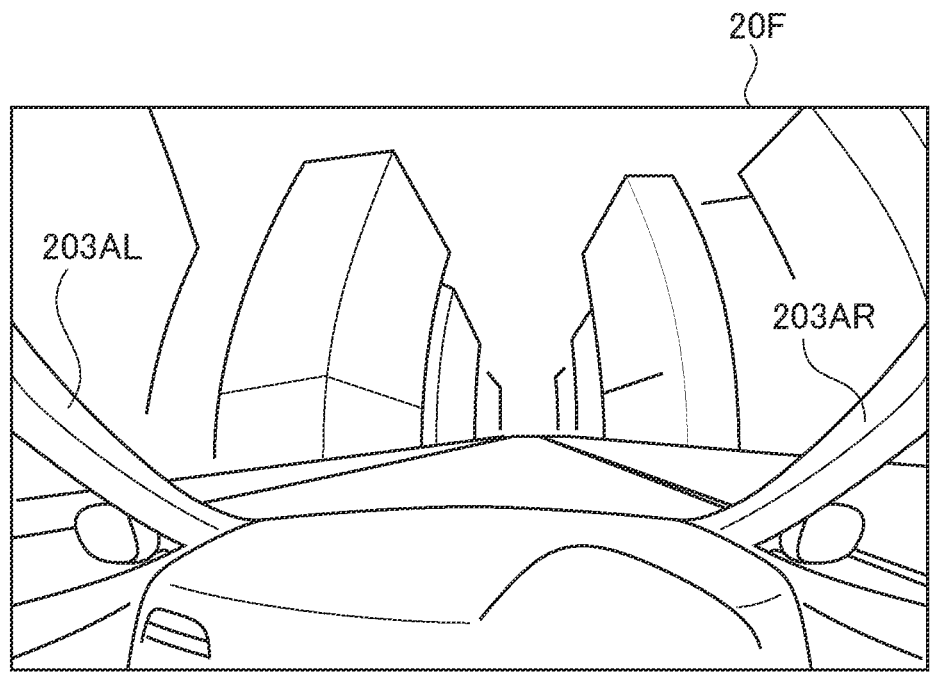
FIG. 10A is a view showing an example of a front image in a state after the direction of the front image is adjusted to conform to the forward direction of the vehicle.
Figure 10B:
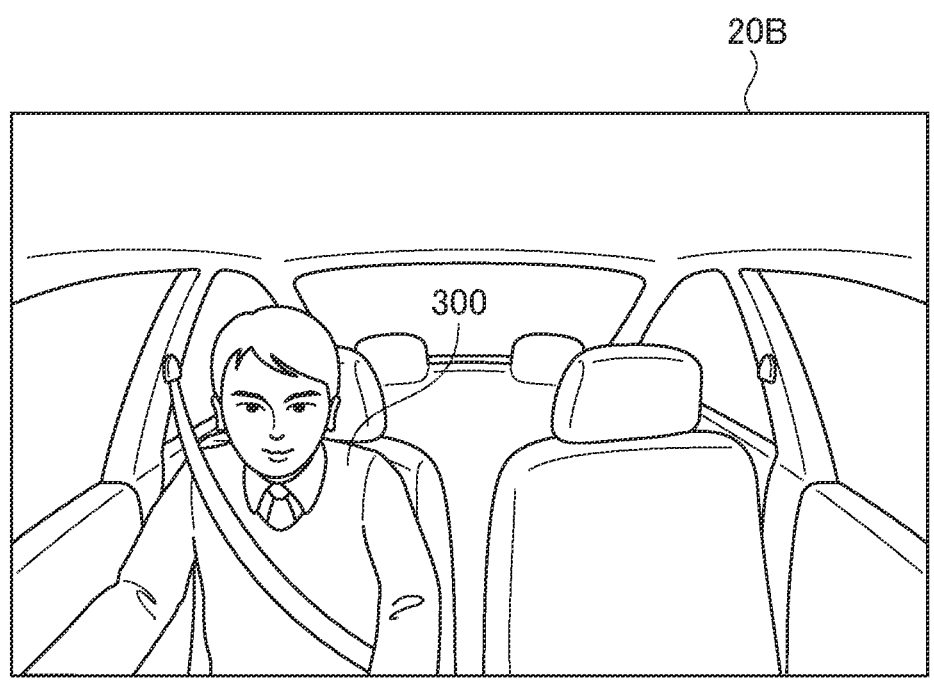
FIG. 10B is a view showing an example of a rear image in the state after the direction of the front image is adjusted to conform to the forward direction of the vehicle.
Figure 10C:
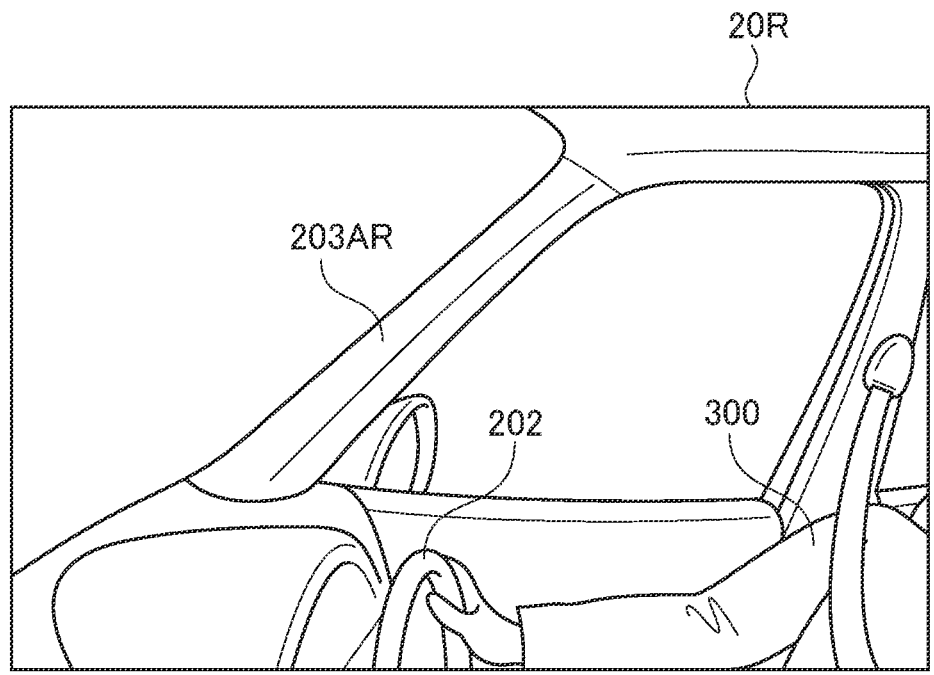
FIG. 10C is a view showing an example of a right-side image in the state after the direction of the front image is adjusted to conform to the forward direction of the vehicle.
Figure 10D:
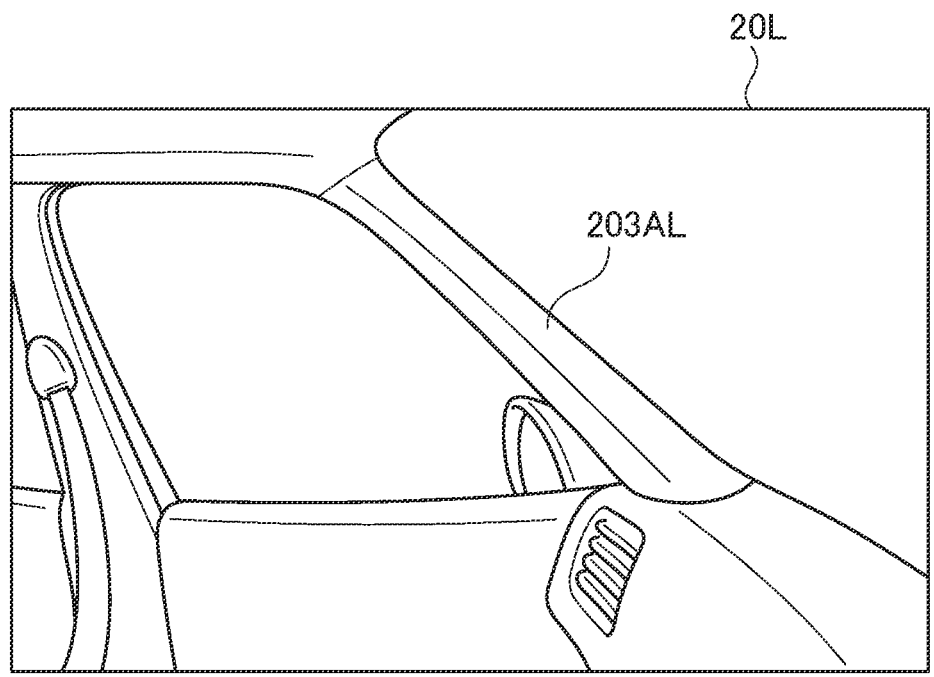
FIG. 10D is a view showing an example of a left-side image in the state after the direction of the front image is adjusted to conform to the forward direction of the vehicle.

FIG. 10A to FIG. 10D schematically show examples of the front image 20F, the rear image 20B, the right-side image 20R, and the left-side image 20L in the state in which the direction of the front image 20F has been adjusted to conform to the actual forward direction of the vehicle 200 through the processing as described above. As illustrated in FIG. 10, the displacement of the front image 20F toward the A-pillar 203AL on the left side has been canceled out. As illustrated in FIG. 10B, the displacement of the rear image 20B toward the right side of the vehicle 200 has been canceled out. As illustrated in FIG. 10C, the displacement of the right-side image 20R toward the front side has been canceled out. As illustrated in FIG. 10D, the displacement of the left-side image 20L toward the rear side has been canceled out.

In a first embodiment, only the front image 20F and the rear image 20B may be generated while the generation of the right-side image 20R and the left-side image 20L is omitted.

As described above, the vehicle imaging device 100 according to a first embodiment includes the image rotation unit 131, the image extraction unit 132, the front-rear-right-left determination unit 142, the motion vector detector 141, and the measurement unit 161. The motion vector detector 141 detects the motion vectors of the captured image of the subject imaged through 360 degrees by the imaging device 12. The front-rear-right-left determination unit 142 determines the front, rear, right, and left directions of the vehicle 200 based on the captured image, and determines the positions of at least the front image region and the rear image region in the captured image in the circumferential direction.

The image rotation unit 131 rotates the captured image about the vanishing point Pv1 (a first vanishing point) of the plural motion vectors radially diverging among the motion vectors detected by the motion vector detector 141 immediately after the vehicle 200 starts moving. The image rotation unit 131 then adjusts the positions of the front image region and the rear image region in the circumferential direction.

The measurement unit 161 measures a first generation time of the vanishing point Pv1 generated in the front image region within the predetermined period of time in the state in which the image rotation unit 131 adjusts the positions of the front image region and the rear image region in the circumferential direction. The measurement unit 161 also measures a second generation time of the vanishing point Pv2 (a second vanishing point) of the plural converging motion vectors generated in the front image region within the predetermined period of time.

The image rotation unit 131 keeps the positions of the front image region and the rear image region in the circumferential direction when the first generation time measured by the measurement unit 161 is longer than the second generation time. The image rotation unit 131 rotates the captured image so as to reverse the front image region and the rear image region when the first generation time measured by the measurement unit 161 is not longer than the second generation time.

The image extraction unit 132 extracts the respective regional images of the front image region and the rear image region kept or reversed by the image rotation unit 131 in the captured image to generate the front image 20F and the rear image 20B.

As described above, the vehicle imaging device 100 according to a first embodiment can correctly extract the front image region and the rear image region of the vehicle 200 from the 360-degree captured image so as to generate the front image 20F and the rear image 20B.

The image rotation unit 131 desirably rotates the captured image about the vanishing point Pv1 generated in the regional image newly defined as the front image region after rotating the captured image to reverse the front image region and the rear image region, and adjusts the positions of the front image region and the rear image region in the circumferential direction.

The image extraction unit 132 desirably corrects the distortion of the front image region and the rear image region extracted and generates the front image 20F and the rear image 20B so as to approximate the view on the front and rear sides of the vehicle 200 that the person is presumed to actually see.

The front-rear-right-left determination unit 142 desirably determines the positions of the right-side image region and the left-side image region in the circumferential direction in the captured image, in addition to the front image region and the rear image region. The image rotation unit 131 desirably adjusts the positions of the right-side image region and the left-side image region in the circumferential direction, in addition to the front image region and the rear image region. The image extraction unit 132 desirably extracts the respective regional images of the right-side image region and the left-side image region in the captured image so as to generate the right-side image 20R and the left-side image 20L, in addition to the front image region and the rear image region.

Second Embodiment

A second embodiment provides a vehicle imaging device 100 that examines a way of correcting a blur of an image of a subject imaged by the vehicle imaging device 100 so as to make a correction accurately. The explanations of the elements in a second embodiment common to those in a first embodiment are not repeated below. The specific configurations of the vehicle imaging device 100 according to a second embodiment are the same as those illustrated in FIG. 2.

FIG. 11 schematically illustrates a condition in which a subject such as a sign is present ahead of the vehicle 200, the vehicle 200 is coming closer to and passing through the subject in association with the movement of the vehicle 200, and the subject is then relatively shifted in the rearward direction. The subject such as a sign does not appear simultaneously in the front image 20F, the right-side image 20R, or the rear image 20B, but FIG. 11 illustrates the respective positions of the subject relatively shifting in the front image 20F, the right-side image 20R, and the rear image 20B.

The position of the subject is barely displaced between the long-period exposure image 21L and the short-period exposure image 21S, and the image of the subject is thus barely blurred in the front image 20F or the rear image 20B since a temporal change of the subject is small. In contrast, since the temporal change of the captured image of the subject located closer to the vehicle 200 is larger in the right-side image 20R and the left-side image 20L, the position of the subject is displaced between the long-period exposure image 21L and the short-period exposure image 21S and the image of the subject is thus blurred in association with a difference in the imaging timing.

As described above, the image of the subject in the right-side image 20R and the left-side image 20L tends to be blurred as compared with the image of the subject in the front image 20F and the rear image 20B. The second embodiment corrects a blur of the image of the subject only in the right-side image 20R and the left-side image 20L as follows.

FIG. 11 illustrates the case in which the HDR image composition unit 133 first shifts the position of the long-period exposure image 21L having been acquired earlier in accordance with the motion vectors in the right-side image 20R so as to conform to the position of the short-period exposure image 21S, and then combines the long-period exposure image 21L and the short-period exposure image 21S together. While FIG. 11 illustrates the case in which the long-period exposure is prior to the short-period exposure, the order of the exposure can be reversed.

FIG. 12 illustrates a case of obtaining an image 21 of the subject with the blur corrected in the right-side image 20R through the processing of correcting the blur of the image by the HDR image composition unit 133. The image 21 with no blur can be obtained in the front image 20F and the rear image 20B without the execution of the processing of correcting the blur of the image by the HDR image composition unit 133, since the temporal change of the subject is small.

Figure 13:
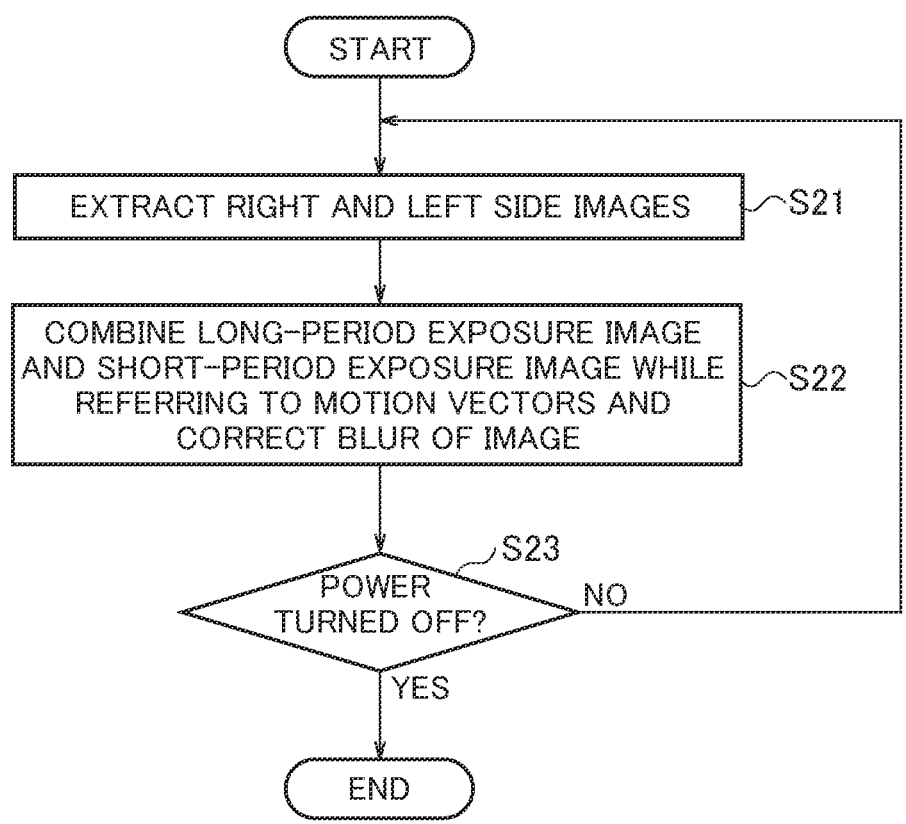
FIG. 13 is a flowchart showing a process of processing executed in a second embodiment.

The processing executed by the image processing unit 13 or the controller 16 in a second embodiment is described below with reference to the flowchart shown in FIG. 13. When the processing starts, the image extraction unit 132 extracts the right-side image region and the left-side image region in step S21. The processing in step S21 may be the processing of extracting the front image region, the rear image region, the right-side image region, and the left-side image region, as in the case of a first embodiment.

The HDR image composition unit 133 refers to the motion vectors to combine the long-period exposure image and the short-period exposure image in the right-side image region and the left-side image region in step S22. This step corrects a blur of the image derived from the difference in the imaging timing between the particular subject included in the right-side image or the left-side image based on the long-period exposure image 21L and the corresponding subject included in the right-side image or the left-side image based on the short-period exposure image 21S.

The controller 16 then determines whether the power of the vehicle imaging device 100 is turned off in step S23. When the power of the vehicle imaging device 100 is not turned off yet (NO), the controller 16 and the image processing unit 13 repeat the processing from step S21 to step S23. When the power of the vehicle imaging device 100 has been turned off (YES), the controller 16 finishes the process.

The configurations and the operations of the vehicle imaging device 100 according to a second embodiment are as follows. The imaging unit 12 in the vehicle imaging device 100 according to a second embodiment generates a long-period exposure image obtained such that a subject is imaged for a first exposure time, and a short-period exposure image obtained such that the subject is imaged for a second exposure time. The vehicle imaging device 100 according to a second embodiment includes the image extraction unit 132, the HDR image composition unit 133, the motion vector detector 141, and the front-rear-right-left determination unit 142.

The motion vector detector 141 detects the motion vectors of the captured image. The front-rear-right-left determination unit 142 determines the positions of at least the right-side image region and the left-side image region in the circumferential direction in the captured image. The image extraction unit 132 extracts the respective regional images of the right-side image region and the left-side image region of the captured image so as to generate the right-side image 20R and the left-side image 20L.

The HDR image composition unit 133 combines the right-side image 20R and the left-side image 20L based on the long-period exposure image with the right-side image 20R and the left-side image 20L based on the short-period exposure image generated by the image extraction unit 132. The HDR image composition unit 133 when combining the respective images refers to the motion vectors detected in the right-side image region or the left-side image region by the motion vector detector 141. This processing expands the dynamic range of the right-side image 20R or the left-side image 20L, and corrects the blur of the subject included in the right-side image 20R or the left-side image 20L.

The vehicle imaging device 100 according to a second embodiment thus can correct the blur of the image accurately.

The front-rear-right-left determination unit 142 desirably further determines the positions of the front image region and the rear image region in the circumferential direction in the captured image, in addition to the right-side image region and the left-side image region. The image extraction unit 132 desirably extracts the respective regional images of the front image region and the rear image region of the captured image, in addition to the right-side image region and the left-side image region, so as to further generate the front image 20F and the rear image 20B.

The HDR image composition unit 133 desirably combines the front image 20F and the rear image 20B based on the long-period exposure image with the front image 20F and the rear image 20B based on the short-period exposure image generated by the image extraction unit 132, without referring to the motion vectors detected by the motion vector detector 141. This expands the dynamic range of the front image 20F and the rear image 20B. The image rotation unit 131 is not necessarily, but preferably included in a second embodiment.

Third Embodiment

A third embodiment is an embodiment developed from a second embodiment. The third embodiment provides a vehicle imaging device 100 that examines which subject having a blur of an image to be corrected should be chosen from subjects included in images generated by the vehicle imaging device 100, so as to correct the blur of the image of the chosen subject accurately. The explanations of the elements in a third embodiment common to those in a first embodiment are not repeated below. The specific configurations of the vehicle imaging device 100 according to a third embodiment are the same as those illustrated in FIG. 2.

Figure 14A:
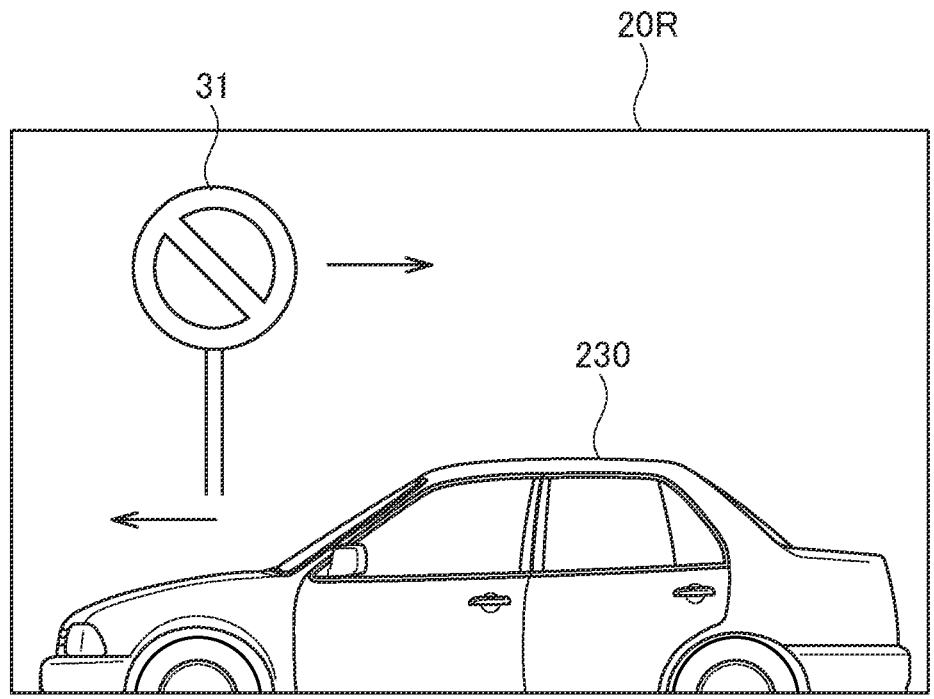
FIG. 14A is a view showing an example of a right-side image in which plural motion vectors in different directions are detected in a vehicle imaging device according to a third embodiment.
Figure 14B:
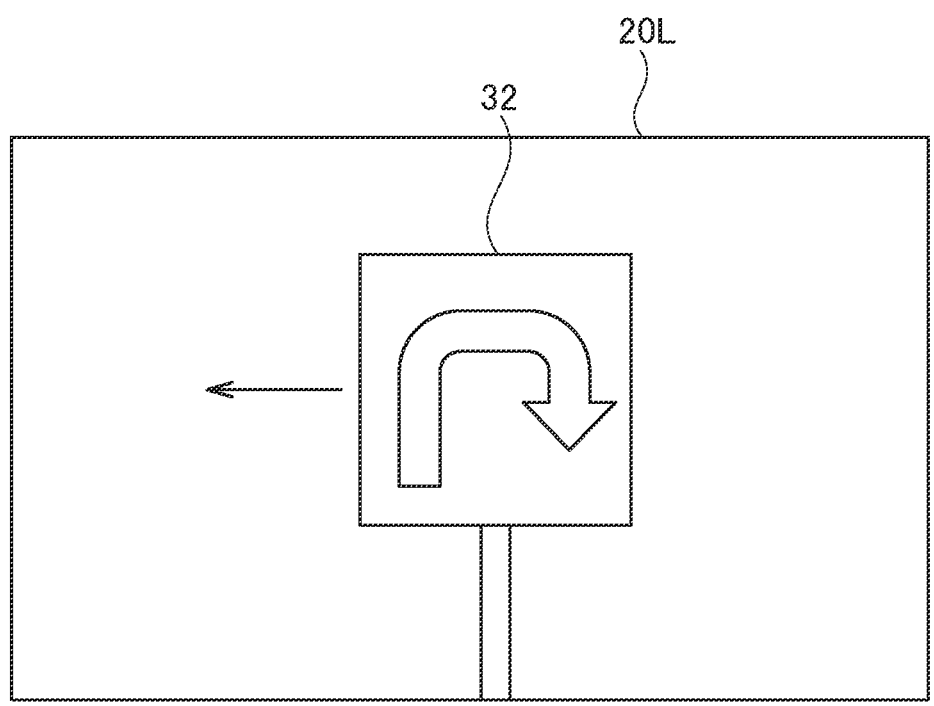
FIG. 14B is a view showing an example of a left-side image in which a single motion vector is detected in the vehicle imaging device according to a third embodiment.

FIG. 14A and FIG. 14B are views showing examples of the right-side image 20R and the left-side image 20L. As illustrated in FIG. 14A, the right-side image 20R includes, as subjects, a vehicle 230 traveling in the adjacent lane on the right side of the vehicle 200 that is the host vehicle (not illustrated) and a sign 31. The vehicle 230 is traveling faster than the vehicle 200, and relatively shifts in the leftward direction (toward the front side of the vehicle 200) in the right-side image 20R. The sign 31 relatively shifts in the rightward direction (toward the rear side of the vehicle 200) in the right-side image 20R. The left-side image 20L includes a sign 32 as a subject. The sign 32 relatively shifts in the leftward direction (toward the rear side of the vehicle 200) in the left-side image 20L.

The controller 16 is assigned the following options as correction modes chosen upon correcting a blur of an image by the HDR image composition unit 133 according to priority determined when plural motion vectors in different shifting directions are detected. The plural motion vectors in different shifting directions may be motion vectors in two directions opposite to each other. The user of the vehicle imaging device 100 such as the driver 300 chooses one of the correction modes via an unillustrated operating unit so as to set the chosen correction mode to the controller 16.

Correction mode 1 is a mode of correcting a blur of a subject shifting in the rearward direction of the vehicle 200. Correction mode 2 is a mode of correcting a blur of a subject shifting in the forward direction of the vehicle 200. Correction mode 3 is a mode of correcting a blur of a subject closer to the vehicle 200. Correction mode 4 is a mode of correcting a blur of a subject shifting in the forward direction of the vehicle 200 when the area of the subject shifting in the forward direction is a predetermined proportion or greater in the right-side image 20R or the left-side image 20L. The predetermined proportion is 20%, for example.

Regarding correction mode 3, the subject, when being a stationary object, shifts at a lower speed as the subject is distant from the vehicle 200, and shifts at a higher speed as the subject is closer to the vehicle 200. The controller 16 can specify the subject closer to the vehicle 200 in accordance with the motion vectors. The image analyzer 14 may analyze the image so as to extract the subject closer to the vehicle 200. The controller 16 in this case can controls the HDR image composition unit 133 so as to correct the blur of the subject closer to the vehicle 200 in accordance with the image analysis result obtained by the image analyzer 14.

The controller 16 desirably independently sets one of the four correction modes 1 to 4 in each of the right-side image 20R and the left-side image 20L.

In the situation illustrated in FIG. 14A, when correction mode 1 is chosen, the blur of the image of the sign 31 is corrected by the HDR image composition unit 133 in the same manner as described with reference to FIG. 11 and FIG. 12. When correction mode 2 is chosen, the blur of the image of the vehicle 230 is corrected by the HDR image composition unit 133. When correction mode 3 is chosen, the blur of the image of the vehicle 230, which is closer to the vehicle 200 than the sign 31, is corrected by the HDR image composition unit 133.

In the situation illustrated in FIG. 14A, when correction mode 4 is chosen, the blur of the image of the vehicle 230 is corrected by the HDR image composition unit 133, since the area of the image of the vehicle 230 relatively shifting in the forward direction of the vehicle 200 is 20% or greater in the right-side image 20R.

In the situation illustrated in FIG. 14B, only the motion vector of the sign 32 shifting in the leftward direction is present. The controller 16 thus controls the HDR image composition unit 133 to correct the blur of the image of the sign 32 while referring to the motion vector in which the sign 32 shifts regardless of the setting of the correction mode.

The processing executed by the image processing unit 13 or the controller 16 in a third embodiment is described below with reference to the flowchart shown in FIG. 15. FIG. 15 illustrates a case of determining that there are motion vectors in two directions opposite to each other after starting the processing.

In step S31 in FIG. 15, the image extraction unit 132 extracts the right-side image region and the left-side image region. The processing in step S31 may be the processing of extracting the front image region, the rear image region, the right-side image region, and the left-side image region, as in the case of a first embodiment. The controller 16 determines whether to choose correction mode 1 of correcting the blur of the subject shifting in the rearward direction of the vehicle 200 prior to the other subject. When correction mode 1 is chosen (YES), the HDR image composition unit 133 corrects the blur of the image of the subject shifting in the rearward direction while referring to the rearward motion vector in step S33, and leads the process to proceed to step S39.

When correction mode 1 is not chosen in step S32 (NO), the controller 16 determines whether to choose correction mode 2 of correcting the blur of the subject shifting in the forward direction of the vehicle 200 prior to the other subject in step S34. When correction mode 2 is chosen (YES), the HDR image composition unit 133 corrects the blur of the image of the subject shifting in the forward direction while referring to the forward motion vector in step S35, and leads the process to proceed to step S39.

When correction mode 2 is not chosen in step S34 (NO), the controller 16 determines whether to choose correction mode 3 of correcting the blur of the subject closer to the vehicle 200 prior to the other subject in step S36. When correction mode 3 is chosen (YES), the HDR image composition unit 133 corrects the blur of the image of the subject closer to the vehicle 200 while referring to the motion vector of the corresponding subject in step S37, and leads the process to proceed to step S39.

When correction mode 3 is not chosen in step S36 (NO), correction mode 4 is determined to be chosen. The controller 16 determines whether the area of the subject shifting in the forward direction of the vehicle 200 is the predetermined proportion or greater in step S38. When the area of the subject shifting in the forward direction of the vehicle 200 is not the predetermined proportion or greater (NO), the HDR image composition unit 133 corrects the blur of the image of the subject shifting in the rearward direction while referring to the rearward motion vector in step S33, and leads the process to proceed to step S39.

When the area of the subject shifting in the forward direction of the vehicle 200 is the predetermined proportion or greater (YES) in step S38, the HDR image composition unit 133 corrects the blur of the image of the subject shifting in the forward direction while referring to the forward motion vector in step S35, and leads the process to proceed to step S39.

The controller 16 then determines whether the power of the vehicle imaging device 100 is turned off in step S39. When the power of the vehicle imaging device 100 is not turned off yet (NO), the controller 16 and the image processing unit 13 repeat the processing from step S31 to step S39. When the power of the vehicle imaging device 100 has been turned off (YES), the controller 16 finishes the process.

The configurations and the operations of the vehicle imaging device 100 according to a third embodiment are as follows. The imaging unit 12 in the vehicle imaging device 100 according to a third embodiment generates a long-period exposure image obtained such that a subject is imaged for a first exposure time, and a short-period exposure image obtained such that the subject is imaged for a second exposure time. The vehicle imaging device 100 according to a third embodiment includes the image extraction unit 132, the HDR image composition unit 133, the motion vector detector 141, and the front-rear-right-left determination unit 142.

The motion vector detector 141 detects the motion vectors of the captured image. The front-rear-right-left determination unit 142 determines the positions of at least the right-side image region and the left-side image region in the circumferential direction in the captured image. The image extraction unit 132 extracts the respective regional images of the right-side image region and the left-side image region of the captured image so as to generate the right-side image 20R and the left-side image 20L.

The HDR image composition unit 133 combines the right-side image 20R and the left-side image 20L based on the long-period exposure image with the right-side image 20R and the left-side image 20L based on the short-period exposure image generated by the image extraction unit 132. The HDR image composition unit 133 when combining the respective images refers to the motion vectors detected in the right-side image region or the left-side image region by the motion vector detector 141.

The motion vector detector 141 sometimes detects plural motion vectors in different directions in the right-side image region or the left-side image region. The HDR image composition unit 133 refers to the motion vector of the subject to be corrected so as to correct the blur of the image of the subject included in the right-side image 20R or the left-side image 20L and determined as a correction target in accordance with the preliminarily chosen correction mode.

The vehicle imaging device 100 according to a third embodiment thus can correct the blur of the image of the chosen subject accurately.

The plural motion vectors in different directions can be a first motion vector in the rearward direction of the vehicle 200 and a second motion vector in the forward direction of the vehicle 200. One of the correction modes can be chosen for the subject as a correction target relatively shifting in the rearward direction of the vehicle 200. The HDR image composition unit 133 in this mode refers to the first motion vector to combine the right-side image 20R or the left-side image 20L generated in accordance with the long-period exposure image with the right-side image 20R or the left-side image 20L generated in accordance with the short-period exposure image.

Another correction mode can be chosen for the subject as a correction target relatively shifting in the forward direction of the vehicle 200. The HDR image composition unit 133 in this mode refers to the second motion vector to combine the right-side image 20R or the left-side image 20L generated in accordance with the long-period exposure image with the right-side image 20R or the left-side image 20L generated in accordance with the short-period exposure image.

When a plurality of subjects are present in the right-side image 20R or the left-side image 20L, another correction mode, other than the above two modes, may be chosen for the subject as a correction target closer to the vehicle 200. The HDR image composition unit 133 refers to the first or second motion vector in which the subject closer to the vehicle 200 is shifting, and combines the right-side image 20R or the left-side image 20L based on the long-period exposure image with the right-side image 20R or the left-side image 20L based on the short-period exposure image.

The right-side image 20R or the left-side image 20L sometimes includes a first subject relatively shifting in the rearward direction of the vehicle 200 and a second subject relatively shifting in the forward direction of the vehicle 200. Still another correction mode, other than the above two or three correction modes, then may be chosen for the subject as a correction target according to the proportion of the area of the second subject in the right-side image 20R or the left-side image 20L.

The HDR image composition unit 133 refers to the first motion vector to combine the right-side image 20R or the left-side image 20L based on the long-period exposure image with the right-side image 20R or the left-side image 20L based on the short-period exposure image when the area of the second subject is not a predetermined proportion or greater in the right-side image 20R or the left-side image 20L. The HDR image composition unit 133 refers to the second motion vector to combine the right-side image 20R or the left-side image 20L based on the long-period exposure image with the right-side image 20R or the left-side image 20L based on the short-period exposure image when the area of the second subject is the predetermined proportion or greater in the right-side image 20R or the left-side image 20L.

Fourth Embodiment

A fourth embodiment provides a vehicle imaging device 100 that can acquire the front image 20F, the rear image 20B, the right-side image 20R, and the left-side image 20L accurately in accordance with an incident direction of sunlight. The explanations of the elements in a fourth embodiment common to those in a first embodiment are not repeated below. The specific configurations of the vehicle imaging device 100 according to a fourth embodiment are the same as those illustrated in FIG. 2.

Figure 16:
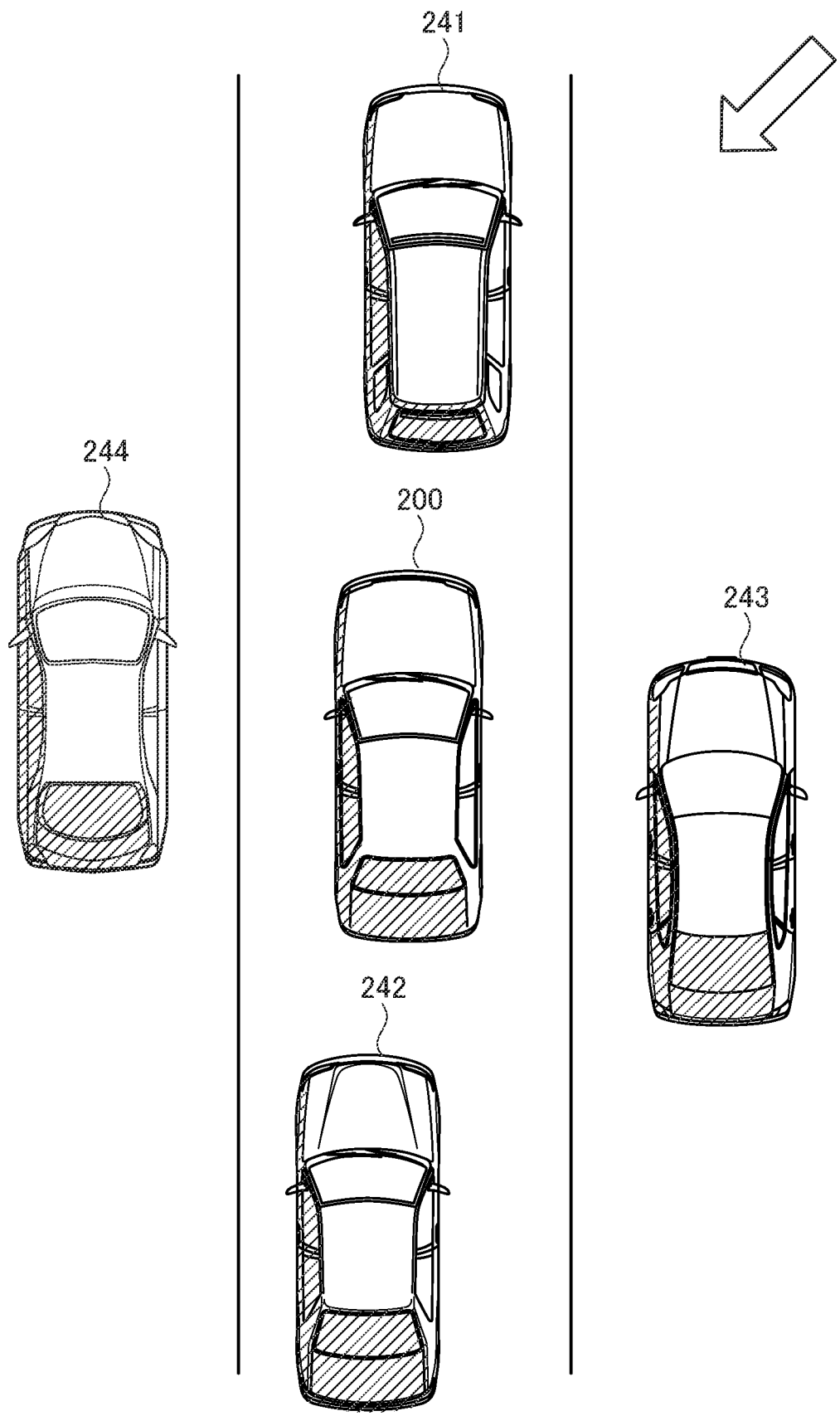
FIG. 16 is a schematic view showing plural vehicles irradiated with sunlight in a direction indicated by the solid-white arrow in a state in which the vehicles are traveling ahead of and behind the host vehicle and the vehicles are traveling in the lanes on the right and left sides of the lane in which the host vehicle is traveling.

FIG. 16 illustrates a case in which a vehicle 241 is traveling ahead of the vehicle 200 that is the host vehicle, and a vehicle 242 is traveling behind the vehicle 200, both being traveling in the same lane as the vehicle 200. FIG. 16 also illustrates a case in which a vehicle 243 is traveling in the right lane and a vehicle 244 is traveling in the left lane next to the vehicle 200. In a case in which the vehicle 200 and the other vehicles 241 to 244 are irradiated with the sunlight in the direction indicated by the solid-white arrow, the vehicle 200 and the other vehicles 241 to 244 each include a bright part without hatching and a dark part indicated by hatching. The bright part and the dark part are caused by the irradiation of the sunlight in the respective subjects depending on the incident direction of the sunlight.

The vehicle imaging device 100 according to a fourth embodiment changes the way of combining the long-period exposure image and the short-period exposure image by the HDR image composition unit 133 depending on the incident direction of the sunlight.

Figure 17:
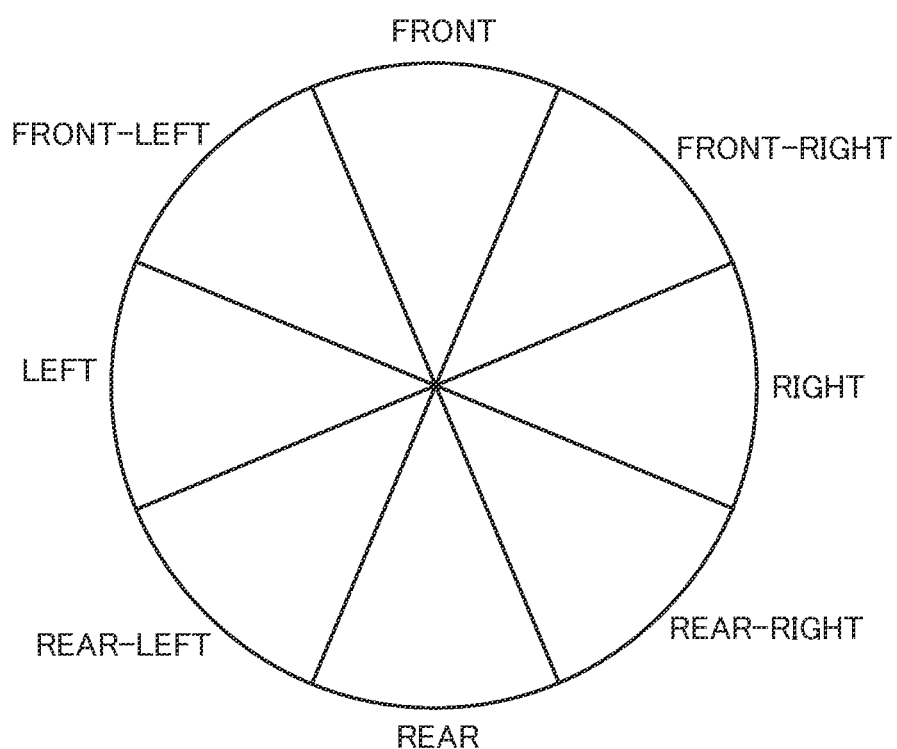
FIG. 17 is a view showing a state in which an incident direction of the sunlight is divided into eight in a fourth embodiment.

As illustrated in FIG. 17, the controller 16 divides the 360-degree direction imaged by the vehicle imaging device 100 into eight 45-degree directions, for example. The controller 16 controls the HDR image composition unit 133 to change the way of combining the long-period exposure image and the short-period exposure image depending on the determination of which is the incident direction of the sunlight among the eight directions. The eight directions are referred to below as a front direction, a front-right direction, a right direction, a rear-right direction, a rear direction, a rear-left direction, a left direction, and a front-left direction. The image analyzer 14 can determine the incident direction of the sunlight by analyzing the captured image. The image analyzer 141 functions as a sunlight incident-direction determination unit of determining the incident direction of the sunlight.

Figure 18A:
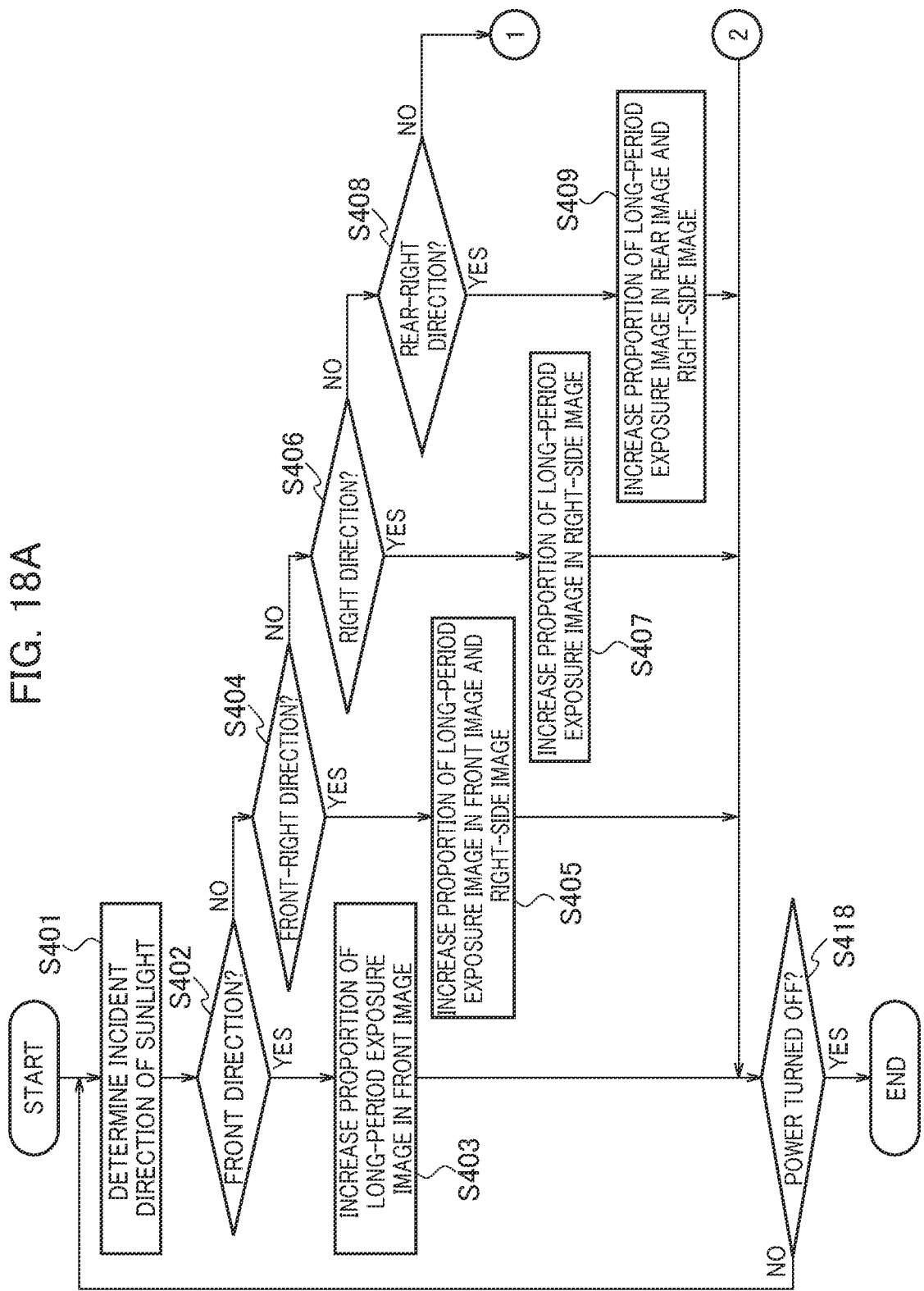
FIG. 18A is a flowchart showing a part of processing executed in a fourth embodiment.

The processing executed by the image processing unit 13, the image analyzer 14, or the controller 16 in a fourth embodiment is described below with reference to the flowcharts shown in FIG. 18A and FIG. 18B. When the processing in FIG. 18A starts, the image analyzer 14 determines the incident direction of the sunlight in step S401. The controller 16 determines whether the incident direction of the sunlight determined by the image analyzer 14 is the front direction in step S402.

When the incident direction of the sunlight is determined to be the front direction in step S402 (YES), the controller 16 controls the HDR image composition unit 133 to set the ratio of the long-period exposure image in the front image 20F to be greater than the ratio of the long-period exposure image in each of the rear image 20B, the right-side image 20R, and the left-side image 20L in step S403. The reason for this is that the vehicle imaging device 100 images the rear side of the vehicle 241, which is shaded, traveling ahead of the vehicle 200. The controller 16 then leads the process to proceed to step S418 continued from step S403.

In a case in which the ratio of the long-period exposure image to the short-period exposure image in each of the rear image 20B, the right-side image 20R, and the left-side image 20L is 4:6, for example, the controller 16 controls the HDR image composition unit 133 to set the ratio of the long-period exposure image to the short-period exposure image in the front image 20F to 9:1.

When the incident direction of the sunlight is determined not to be the front direction in step S402 (NO), the controller 16 determines whether the incident direction of the sunlight is determined to be the front-right direction in step S404. When the incident direction of the sunlight is determined to be the front-right direction (YES), the controller 16 controls the HDR image composition unit 133 to set the ratio of the long-period exposure image in each of the front image 20F and the right-side image 20R to be greater than the ratio of the long-period exposure image in each of the rear image 20B and the left-side image 20L in step S405. The controller 16 then leads the process to proceed to step S418 continued from step S405.

In a case in which the ratio of the long-period exposure image to the short-period exposure image in the rear image 20B and the left-side image 20L is 4:6, for example, the controller 16 controls the HDR image composition unit 133 to set the ratio of the long-period exposure image to the short-period exposure image in the front image 20F and the right-side image 20R to 9:1.

When the incident direction of the sunlight is determined not to be the front-right direction in step S404 (NO), the controller 16 determines whether the incident direction of the sunlight is determined to be the right direction in step S406. When the incident direction of the sunlight is determined to be the right direction (YES), the controller 16 controls the HDR image composition unit 133 to set the ratio of the long-period exposure image in the right-side image 20R to be greater than the ratio of the long-period exposure image in each of the front image 20F, the rear image 20B, and the left-side image 20L in step S407. The way of increasing the ratio of the long-period exposure image is the same as the way described in step S405. The controller 16 then leads the process to proceed to step S418 continued from step S407.

When the incident direction of the sunlight is determined not to be the right direction in step S406 (NO), the controller 16 determines whether the incident direction of the sunlight is determined to be the rear-right direction in step S408. When the incident direction of the sunlight is determined to be the rear-right direction (YES), the controller 16 controls the HDR image composition unit 133 to set the ratio of the long-period exposure image in each of the rear image 20B and right-side image 20R to be greater than the ratio of the long-period exposure image in each of the front image 20F and the left-side image 20L in step S409. The way of increasing the ratio of the long-period exposure image is the same as the way described in step S405. The controller 16 then leads the process to proceed to step S418 continued from step S409.

Figure 18B:
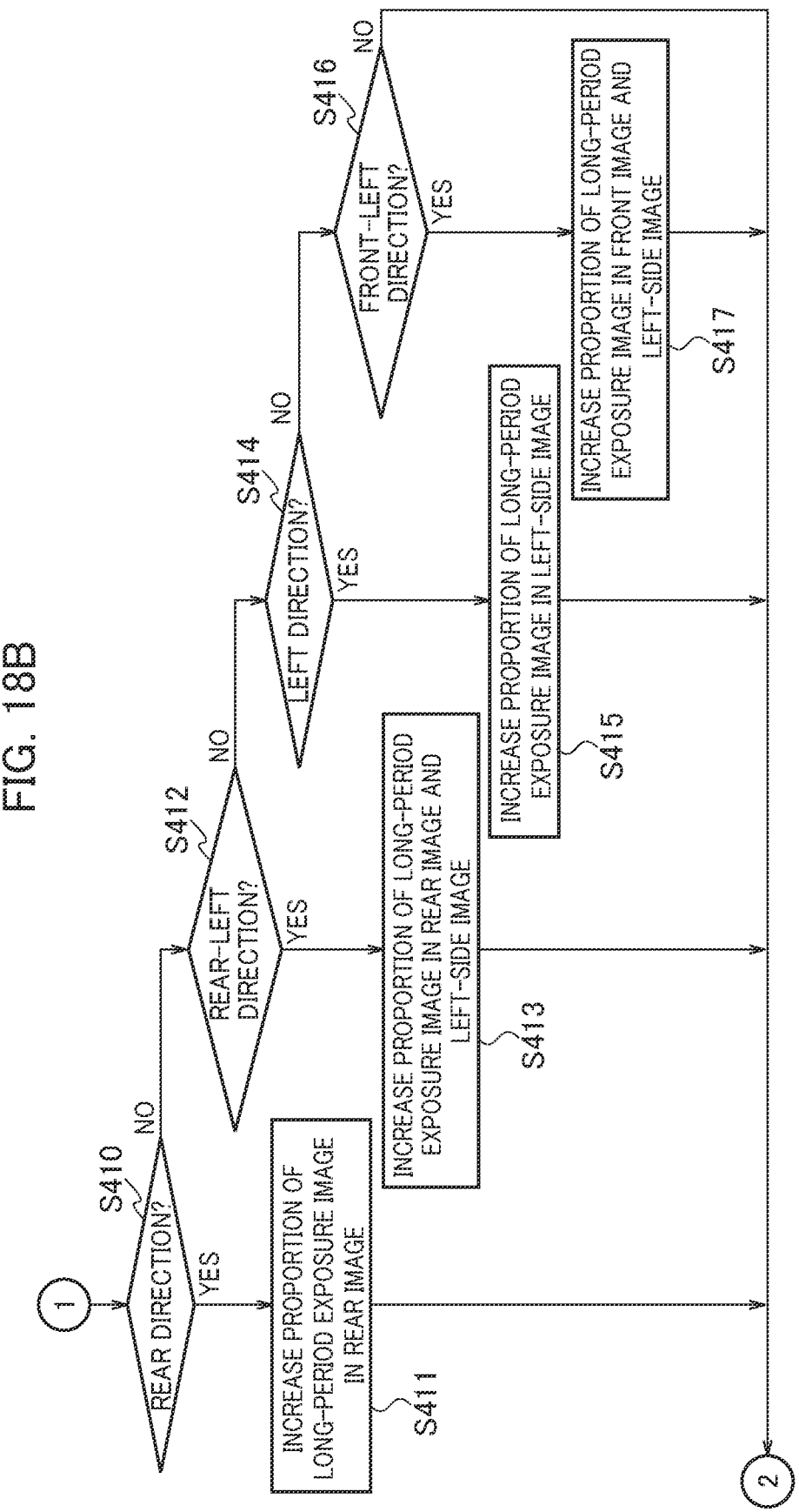
FIG. 18B is a flowchart showing a part of the processing executed in a fourth embodiment continued from the processing shown in FIG. 18A.

When the incident direction of the sunlight is determined not to be the rear-right direction in step S408 (NO), the controller 16 determines whether the incident direction of the sunlight is determined to be the rear direction in step S410 shown in FIG. 18B. When the incident direction of the sunlight is determined to be the rear direction (YES), the controller 16 controls the HDR image composition unit 133 to set the ratio of the long-period exposure image in the rear image 20B to be greater than the ratio of the long-period exposure image in each of the front image 20F, the right-side image 20R, and the left-side image 20L in step S411. The way of increasing the ratio of the long-period exposure image is the same as the way described in step S405. The controller 16 then leads the process to proceed to step S418 continued from step S411.

When the incident direction of the sunlight is determined not to be the rear direction in step S410 (NO), the controller 16 determines whether the incident direction of the sunlight is determined to be the rear-left direction in step S412. When the incident direction of the sunlight is determined to be the rear-left direction (YES), the controller 16 controls the HDR image composition unit 133 to set the ratio of the long-period exposure image in each of the rear image 20B and left-side image 20L to be greater than the ratio of the long-period exposure image in each of the front image 20F and the right-side image 20L in step 3413. The way of increasing the ratio of the long-period exposure image is the same as the way described in step S405.

The controller 16 then leads the process to proceed to step S418 continued from step S413.

When the incident direction of the sunlight is determined not to be the rear-left direction in step S412 (NO), the controller 16 determines whether the incident direction of the sunlight is determined to be the left direction in step S414. When the incident direction of the sunlight is determined to be the left direction (YES), the controller 16 controls the HDR image composition unit 133 to set the ratio of the long-period exposure image in the left-side image 20L to be greater than the ratio of the long-period exposure image in each of the front image 20F, the rear image 20B, and the right-side image 20R in step S415. The way of increasing the ratio of the long-period exposure image is the same as the way described in step S405. The controller 16 then leads the process to proceed to step S418 continued from step S415.

When the incident direction of the sunlight is determined not to be the left direction in step S414 (NO), the controller 16 determines whether the incident direction of the sunlight is determined to be the front-left direction in step S416. When the incident direction of the sunlight is determined to be the front-left direction (YES), the controller 16 controls the HDR image composition unit 133 to set the ratio of the long-period exposure image in each of the front image 20F and left-side image 20L to be greater than the ratio of the long-period exposure image in each of the rear image 20B and the right-side image 20L in step S417. The way of increasing the ratio of the long-period exposure image is the same as the way described in step S405. The controller 16 then leads the process to proceed to step S418 continued from step S417.

When the incident direction of the sunlight is determined not to be the front-left direction in step S416 (NO), the controller 16 leads the process to proceed to step S418.

The controller 16 then determines whether the power of the vehicle imaging device 100 is turned off in step S418. When the power of the vehicle imaging device 100 is not turned off yet (NO), the image processing unit 13, the image analyzer 14, or the controller 16 repeats the processing from step S401 to step S418. When the power of the vehicle imaging device 100 has been turned off (YES), the controller 16 finishes the process.

The configurations and the operations of the vehicle imaging device 100 according to a fourth embodiment are as follows. The imaging unit 12 in the vehicle imaging device 100 according to a fourth embodiment generates a long-period exposure image obtained such that a subject is imaged for a first exposure time, and a short-period exposure image obtained such that the subject is imaged for a second exposure time. The vehicle imaging device 100 according to a fourth embodiment includes the sunlight incident-direction determination unit (the image analyzer 14), the image extraction unit 132, the HDR image composition unit 133, and the front-rear-right-left determination unit 142.

The front-rear-right-left determination unit 142 determines the positions of the front image region, the rear image region, the right-side image region, and the left-side image region in the circumferential direction in the captured image. The image extraction unit 132 extracts the respective regional images of the front image region, the rear image region, the right-side image region, and the left-side image region of the captured image, and generates the respective directional images of the front image 20F, the rear image 20B, the right-side image 20R, and the left-side image 20L.

The HDR image composition unit 133 combines the front image 20F, the rear image 20B, the right-side image 20R, and the left-side image 20L generated in accordance with the long-period exposure image with the front image 20F, the rear image 20B, the right-side image 20R, and the left-side image 20L generated in accordance with the short-period exposure image.

The HDR image composition unit 133 sets the ratio of the directional image based on the long-period exposure image chosen from the front image 20F, the rear image 20B, the right-side image 20R, and the left-side image 20L depending on the incident direction of the sunlight determined by the sunlight incident-direction determination unit to be greater than the ratio of the other directional images based on the long-period exposure image not chosen.

The vehicle imaging device 100 according to a fourth embodiment can acquire the front image 20F, the rear image 20B, the right-side image 20R, and the left-side image 20L accurately in accordance with the incident direction of the sunlight.

The sunlight incident-direction determination unit divides the 360-degree direction imaged by the vehicle imaging device 100 into a plurality of directions including at least the front direction, the rear direction, the right direction, and the left direction, so as to determine which is the incident direction of the sunlight.

The HDR image composition unit 133 desirably increases the ratio of the front image based on the long-period exposure image when the incident direction of the sunlight is the front direction, and increases the ratio of the rear image based on the long-period exposure image when the incident direction of the sunlight is the rear direction. The HDR image composition unit 133 desirably increases the ratio of the right-side image based on the long-period exposure image when the incident direction of the sunlight is the right direction, and increases the ratio of the left-side image based on the long-period exposure image when the incident direction of the sunlight is the left direction.

The sunlight incident-direction determination unit desirably divides the 360-degree direction imaged by the vehicle imaging device 100 into a plurality of directions including the front-right direction, the rear-right direction, the rear-left direction, and the front-left direction, in addition to the front direction, the rear direction, the right direction, and the left direction, so as to determine which is the incident direction of the sunlight.

The HDR image composition unit 133 desirably increases the ratio of the front image and the right-side image based on the long-period exposure image when the incident direction of the sunlight is the front-right direction, and increases the ratio of the rear image and the right-side image based on the long-period exposure image when the incident direction of the sunlight is the rear-right direction. The HDR image composition unit 133 desirably increases the ratio of the rear image and the left-side image based on the long-period exposure image when the incident direction of the sunlight is the rear-left direction, and increases the ratio of the front image and the left-side image based on the long-period exposure image when the incident direction of the sunlight is the front-left direction.

Fifth Embodiment

A fifth embodiment provides a vehicle imaging device 100 that can acquire the front image 20F, the rear image 20B, the right-side image 20R, and the left-side image 20L accurately in accordance with the respective positions of the traveling vehicle 200 before entering a tunnel, during traveling in the tunnel, and after coming out of the tunnel. The explanations of the elements in a fifth embodiment common to those in a first embodiment are not repeated below. The specific configurations of the vehicle imaging device 100 according to a fifth embodiment are the same as those illustrated in FIG. 2.

As illustrated in FIG. 19, the vehicle 200 is traveling in a region R51 on a road and is reaching a tunnel 50. The image inside the tunnel 50 included in the front image 20F at this point has a predetermined proportion or greater. To clearly visually recognize the image inside the tunnel 50, the controller 16 desirably controls the HDR image composition unit 133 so as to increase a ratio of the long-period exposure image in the front image 20F when the HDR image composition unit 133 combines the long-period exposure image with the short-period exposure image.

In a case in which the ratio of the long-period exposure image to the short-period exposure image is 4:6 before the vehicle 200 reaches the region R51 in a state in which the image inside the tunnel 50 is not included in the captured image, for example, the controller 16 increases and sets the ratio of the long-period exposure image to the short-period exposure image in the front image 20F to 8:2.

The vehicle 200 is further coming closer to the entrance 50in of the tunnel 50, and the vehicle 200 reaches a region R52 to partly enter the tunnel 50. The controller 16 then desirably controls the HDR image composition unit 133 so as to increase the ratio of the long-period exposure image in each of the right-side image 20R and the left-side image 20L when combining the long-period exposure image with the short-period exposure image.

In a case in which the ratio of the long-period exposure image to the short-period exposure image in each of the right-side image 20R and the left-side image 20L is 4:6 when the vehicle 200 is traveling in the region 51, for example, the controller 16 increases and sets the ratio of the long-period exposure image to the short-period exposure image in each of the right-side image 20R and the left-side image 20L to 8:2.

The vehicle 200 keeps traveling in the tunnel 50 and reaches a region 53. The image excluding the tunnel 50 toward the entrance 50in of the tunnel 50 included in the rear image 50B at this point has a predetermined proportion or less. The controller 16 desirably controls the HDR image composition unit 133 so as to increase the ratio of the long-period exposure image in the rear image 20B when combining the long-period exposure image with the short-period exposure image.

In a case in which the ratio of the long-period exposure image to the short-period exposure image in the rear image 20B is 4:6 when the vehicle 200 is traveling in the regions R51 and R52, for example, the controller 16 increases and sets the ratio of the long-period exposure image to the short-period exposure image in the rear image 20B to 8:2.

The vehicle 200 keeps traveling in the tunnel 50 and reaches a region R54 closer to the exit 50out of the tunnel 50. The image excluding the tunnel 50 toward the exit 50out of the tunnel 50 included in the front image 20F at this point has a predetermined proportion or greater. To clearly visually recognize the image outside the tunnel 50, the controller 16 desirably controls the HDR image composition unit 133 so as to decrease the ratio of the long-period exposure image in the front image 20F when combining the long-period exposure image with the short-period exposure image.

Since the ratio of the long-period exposure image to the short-period exposure image in the front image 20F immediately before the vehicle 200 reaches the region R54 is 8:2 in the above case, the ratio of the long-period exposure image to the short-period exposure image is set to 4:6 when reaching the region R54.

The vehicle 200 keeps traveling in the tunnel 50, and the vehicle 200 reaches a region R55 to partly come out of the exit 50out of the tunnel 50. The controller 16 then desirably controls the HDR image composition unit 133 so as to decrease the ratio of the long-period exposure image in each of the right-side image 20R and the left-side image 20L when combining the long-period exposure image with the short-period exposure image.

Since the ratio of the long-period exposure image to the short-period exposure image in each of the right-side image 20R and the left-side image 20L immediately before the vehicle 200 reaches the region R55 is 8:2 in the above case, the ratio of the long-period exposure image to the short-period exposure image is set to 4:6 after reaching the region R55.

When the vehicle 200 completely comes out of the tunnel 50 and reaches a region R56, the image inside the tunnel 50 included in the rear image 20B has a predetermined proportion or less. The controller 16 then desirably controls the HDR image composition unit 133 so as to decrease the ratio of the long-period exposure image in the rear image 20R when the HDR image composition unit 133 combines the long-period exposure image with the short-period exposure image.

Since the ratio of the long-period exposure image to the short-period exposure image in the rear image 20B immediately before the vehicle 200 reaches the region R56 is 8:2 in the above case, the ratio of the long-period exposure image to the short-period exposure image is set to 4:6 after reaching the region R56.

The determination of which point the vehicle 200 is currently traveling in the regions R51 to R56 illustrated in FIG. 19 can be made by the image analyzer 14 in accordance with the captured image. The image analyzer 14 functions as a tunnel travelling determination unit.

When the vehicle imaging device 100 includes a global navigation satellite system (GNSS) receiver that receives radio waves from a satellite for a GNSS such as a global positioning system (GPS) and has map information, the controller 16 may detect the positions of the vehicle 200 at the respective points during traveling inside and outside the tunnel 50 in accordance with GNSS signals received by the GNSS receiver and the map information. The controller 16 in this case functions as a tunnel travelling determination unit.

Figure 20A:
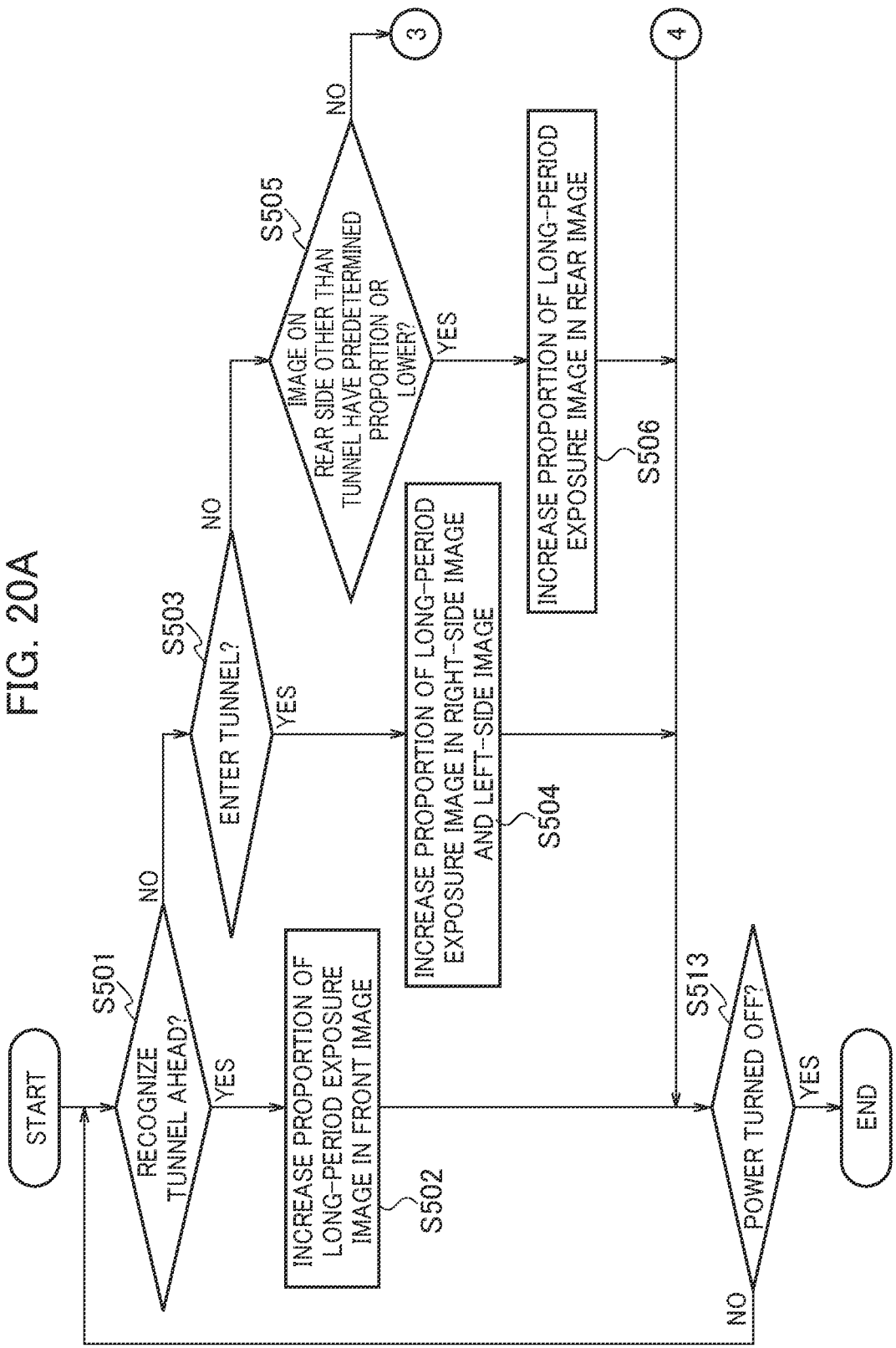
FIG. 20A is a flowchart showing a part of processing executed in a fifth embodiment.

The processing executed by the image processing unit 13, the tunnel travelling determination unit (the image analyzer 14), or the controller 16 in a fifth embodiment is described below with reference to the flowcharts shown in FIG. 20A and FIG. 20B. When the processing in FIG. 20A starts, the tunnel travelling determination unit recognizes the tunnel 50 ahead of the vehicle 200 and determines whether the image inside the tunnel 50 has a predetermined proportion or greater in step S501.

When the image inside the tunnel 50 is determined to have the predetermined proportion or greater in step S501 (YES), the controller 16 controls the HDR image composition unit 133 to increase the ratio of the long-period exposure image in the front image 20F in step S502, and leads the process to proceed to step S513. When the image inside the tunnel 50 is determined not to be the predetermined proportion or greater yet in step S501 (NO), the tunnel traveling determination unit determines whether the vehicle 200 is entering the tunnel 50 in step S503.

When the vehicle 200 is determined to enter the tunnel 50 in step S503 (YES), the controller 16 controls the HDR image composition unit 133 to increase the ratio of the long-period exposure image in each of the right-side image 20R and the left-side image 20L in step S504, and leads the process to proceed to step S513. When the vehicle 200 is determined not to enter the tunnel 50 yet in step S503 (NO), the tunnel traveling determination unit determines whether the image excluding the tunnel 50 toward the entrance 50in of the tunnel 50 included in the rear image 20B is a predetermined proportion or less in step S505.

When the image excluding the tunnel 50 toward the entrance 50in of the tunnel 50 is determined to be the predetermined proportion or less in step S505 (YES), the controller 16 controls the HDR image composition unit 133 to increase the ratio of the long-period exposure image in the rear image 20B in step S506, and leads the process to proceed to step S513. When the image excluding the tunnel 50 toward the entrance 50in of the tunnel 50 is determined not to be the predetermined proportion or less in step S505 (NO), the tunnel traveling determination unit determines whether the image excluding the tunnel 50 toward the exit 50out of the tunnel 50 included in the front image 20F is a predetermined proportion or greater in step S507 shown in FIG. 20B.

When the image excluding the tunnel 50 toward the exit 50out of the tunnel 50 is determined to be the predetermined proportion or greater in step S507 (YES), the controller 16 controls the HDR image composition unit 133 to decrease the ratio of the long-period exposure image in the front image 20F in step S508, and leads the process to proceed to step S513. When the image excluding the tunnel 50 toward the exit 50out of the tunnel 50 is determined not to be the predetermined proportion or greater in step S507 (NO), the tunnel traveling determination unit determines whether a part of the vehicle 200 comes out of the tunnel 50 in step S509.

When a part of the vehicle 200 is determined to come out of the tunnel 50 in step S509 (YES), the controller 16 controls the HDR image composition unit 133 to decrease the ratio of the long-period exposure image in each of the right-side image 20R and the left-side image 20L in step S510, and leads the process to proceed to step S513. When a part of the vehicle 200 is determined not to come out of the tunnel 50 in step S509 (NO), the tunnel traveling determination unit determines whether the vehicle 200 comes out of the tunnel 50 and the image inside the tunnel 50 included in the rear image 20B is a predetermined proportion or less in step S511.

When the image inside the tunnel 50 is determined to be the predetermined proportion or less in step S511 (YES), the controller 16 controls the HDR image composition unit 133 to decrease the ratio of the long-period exposure image in the rear image 20B in step S512, and leads the process to proceed to step S513. When the image inside the tunnel 50 is determined not to be the predetermined proportion or less in step S511 (NO), the controller 16 leads the process to proceed to step S513.

The controller 16 then determines whether the power of the vehicle imaging device 100 is turned off in step S513. When the power of the vehicle imaging device 100 is not turned off yet (NO), the image processing unit 13, the tunnel traveling determination unit, or the controller 16 repeats the processing from step S501 to step S513. When the power of the vehicle imaging device 100 has been turned off (YES), the controller 16 finishes the process.

The configurations and the operations of the vehicle imaging device 100 according to a fifth embodiment are as follows. The imaging unit 12 in the vehicle imaging device 100 according to a fifth embodiment generates a long-period exposure image obtained such that a subject is imaged for a first exposure time, and a short-period exposure image obtained such that the subject is imaged for a second exposure time. The vehicle imaging device 100 according to a fifth embodiment includes the tunnel traveling determination unit (the image analyzer 14), the image extraction unit 132, the HDR image composition unit 133, and the front-rear-right-left determination unit 142.

The front-rear-right-left determination unit 142 determines the positions of the front image region, the rear image region, the right-side image region, and the left-side image region in the circumferential direction in the captured image. The image extraction unit 132 extracts the respective regional images of the front image region, the rear image region, the right-side image region, and the left-side image region of the captured image, and generates the respective directional images of the front image 20F, the rear image 20B, the right-side image 20R, and the left-side image 20L.

The HDR image composition unit 133 combines the front image 20F, the rear image 20B, the right-side image 20R, and the left-side image 20L generated in accordance with the long-period exposure image with the front image 20F, the rear image 20B, the right-side image 20R, and the left-side image 20L generated in accordance with the short-period exposure image.

The tunnel traveling determination unit determines the states during the period in which the traveling vehicle 200 comes closer to the tunnel 50, enters the tunnel 50 and travels in the tunnel 50, and comes out of the tunnel 50.

The HDR image composition unit 133 adjusts the ratio of the directional image based on the long-period exposure image or the ratio of the directional image based on the short-period exposure image chosen from the front image 20F, the rear image 20B, the right-side image 20R, and the left-side image 20L. The HDR image composition unit 133 adjusts the respective ratios based on the determination made by the tunnel traveling determination unit in accordance with the positions of the vehicle 200 at the respective points before entering the tunnel 50, during traveling in the tunnel 50, and after coming out of the tunnel 50.

In particular, the HDR image composition unit 133 desirably adjusts the respective ratios in accordance with the positions of the vehicle 200 as follows.

When the tunnel traveling determination unit determines that the vehicle 200 comes close to the tunnel 50 and the image inside the tunnel 50 is a predetermined proportion or greater in the front image 20F, the HDR image composition unit 133 desirably increases the ratio of the front image 20F based on the long-period exposure image.

When the tunnel traveling determination unit determines that the vehicle 200 enters the tunnel 50, the HDR image composition unit 133 desirably increases the ratio of each of the right-side image 20R and the left-side image 20L based on the long-period exposure image.

When the tunnel traveling determination unit determines that the image excluding the tunnel 50 toward the entrance 50in of the tunnel 50 after the vehicle 20 enters the tunnel 50 is a predetermined proportion or less in the rear image 20B, the HDR image composition unit 133 desirably increases the ratio of the rear image 20B based on the long-period exposure image.

When the tunnel traveling determination unit determines that the vehicle 200 comes closer to the exit 50out of the tunnel 50 and the image excluding the tunnel 50 toward the exit 50out of the tunnel 50 is a predetermined proportion or greater in the front image 20F, the HDR image composition unit 133 desirably decreases the ratio of the front image 20F based on the long-period exposure image.

Namely, the HDR image composition unit 133 returns the ratio of the front image 20F based on the long-period exposure image having been increased at the point when the vehicle 200 comes closer to the tunnel 50 described above to the original ratio.

When the tunnel traveling determination unit determines that the vehicle 200 comes out of the tunnel 50, the HDR image composition unit 133 desirably decreases the ratio of each of the right-side image 20R and the left-side image 20L based on the long-period exposure image. Namely, the HDR image composition unit 133 returns the ratio of the right-side image 20R and the left-side image 20L based on the long-period exposure image having been increased at the point when the vehicle 200 enters the tunnel 50 described above to the original ratio.

When the tunnel traveling determination unit determines that the vehicle 200 comes out of the tunnel 50 and the image inside the tunnel 50 is a predetermined proportion or less in the rear image 20B, the HDR image composition unit 133 desirably decreases the ratio of the rear image 20B based on the long-period exposure image.

Namely, the HDR image composition unit 133 returns, to the original ratio, the ratio of the rear image 20B based on the long-period exposure image having been increased at the point when the image excluding the tunnel 50 toward the entrance 50in of the tunnel 50 is the predetermined proportion or less in the rear image 20B.

As described above, the vehicle imaging device 100 according to a fifth embodiment can acquire the front image 20F, the rear image 20B, the right-side image 20R, and the left-side image 20L accurately in accordance with the respective positions of the traveling vehicle 200 from the point before entering the tunnel 50 to the point after coming out of the tunnel 50.

Sixth Embodiment

A sixth embodiment provides a vehicle imaging device 100 that can acquire to save a captured image with a smaller blur upon an occurrence of an event such as an accident to the vehicle 200. The explanations of the elements in a sixth embodiment common to those in a first embodiment are not repeated below.

Figure 21:
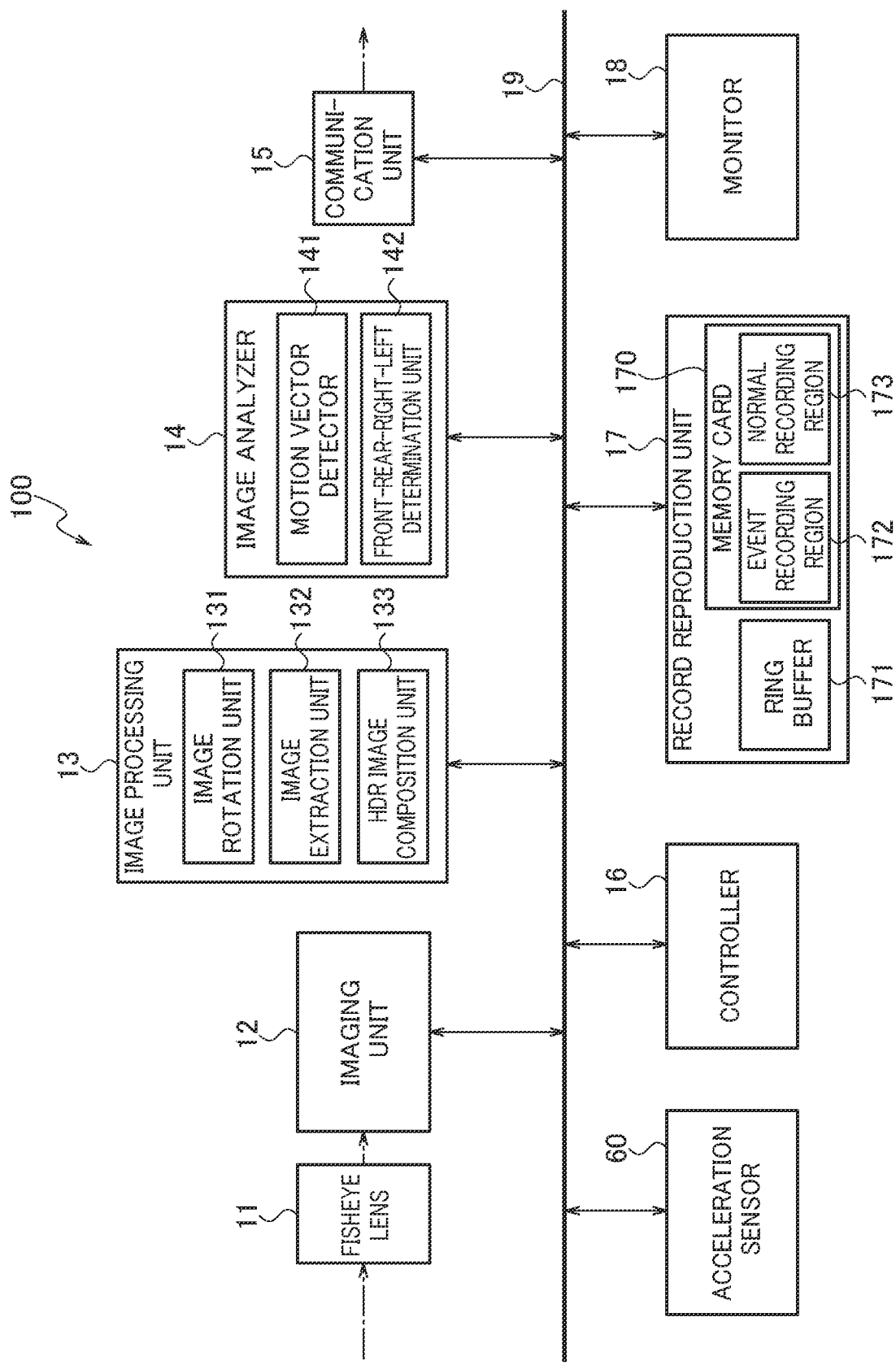
FIG. 21 is a block diagram showing a specific configuration example of a vehicle imaging device according to a sixth embodiment.

As illustrated in FIG. 21, the vehicle imaging device 100 according to a sixth embodiment includes an acceleration sensor 60 connected to the bus 19. The acceleration sensor 60 is an example of an event detection sensor that determines whether any event occurs to the vehicle 200. The record reproduction unit 17 includes the memory card 170 and a ring buffer 171. The ring buffer 171 is an undetachable base memory included in the vehicle imaging device 100. The memory card 170 is provided with an event recording region 172 and a normal recording region 173. The event recording region 172 is a recording region in which data is not overwritten automatically.

The arrangement position of the event recording region 172 and the normal recording region 173 is not limited to the memory card 170. The event recording region 172 may be provided in the base memory. The normal recording region 173 may be provided in the base memory. The event recording region 172 and the normal recording region 173 both may be provided in the base memory.

The ring buffer 171 has a capacity sufficient to record captured image data of 360-degree captured images of long-period exposure images and short-period exposure images for a predetermined period of time, and the captured image data is cyclically stored in the ring buffer 171. In particular, when the ring buffer 171 is filled to capacity with the captured image data stored, the oldest captured image data is rewritten to be replaced with the latest captured image data. The operation of updating the captured image data is repeated.

The front image 20F, the rear image 20B, the right-side image 20R, and the left-side image 20L combined by the HDR image composition unit 133 are recorded in the normal recording region 173 without being recorded temporarily in the ring buffer 171.

Figure 22:
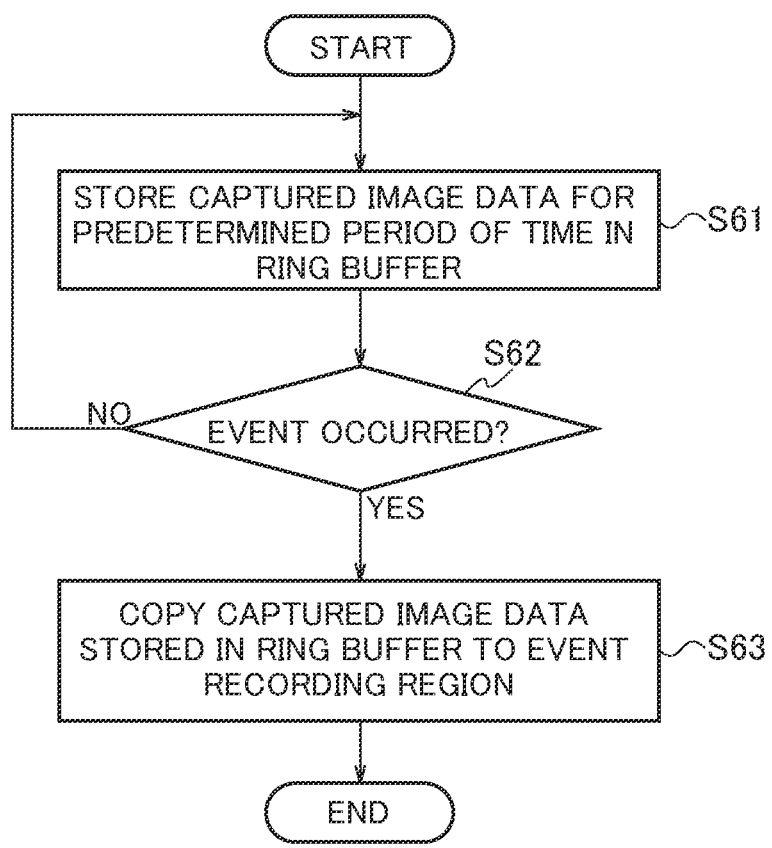
FIG. 22 is a flowchart showing a process of processing executed in a sixth embodiment.

The processing executed by the controller 16 according to a sixth embodiment is described below with reference to the flowchart shown in FIG. 22. When the processing starts, the controller 16 causes the captured image data for a predetermined period of time to be stored in the ring buffer 171 in step S61. As described above, the captured image data is the data of the 360-degree captured images of the long-period exposure images and the short-period exposure images.

The controller 16 determines whether any event occurs to the vehicle 200 in accordance with a change in the acceleration detected by the acceleration sensor 60 in step S62. The controller 16 determines that an event has occurred when the acceleration is rapidly increased or rapidly reduced.

When no event is determined to have occurred in step S62 (NO), the controller 16 repeats the processing in step S61 and step S62. When an event is determined to have occurred in step S62 (YES), the controller 16 leads the process to proceed to step S63. The controller 16 copies the captured image data stored in the ring buffer 171 to the event recording region 172 in step S63, and finishes the processing.

A subject, which is preferably recorded in the normal recording region 173 without blur, would be recorded undesirably in a blurred state upon the occurrence of an event. In particular, the following case may be presumed in which the image having a large blur is recorded in the normal recording region 173.

In a case in which the area of the vehicle 230 illustrated in FIG. 14A is less than 20% in the right-side image 20R, a blur in the image of the sign 31 relatively shifting in the rearward direction in the right-side image 20R is corrected by the HDR image composition unit 133. If an accident between the vehicle 200 and the vehicle 230 occurs in the above case, the blur in the image of the vehicle 230 is not corrected by the HDR image composition unit 133, while the image having a large blur is directly recorded in the normal recording region 173.

It is not sufficient to save the combination image of the long-period exposure image and the short-period exposure image combined by the HDR image composition unit 133 directly in the normal recording region 173 upon the occurrence of the event. Instead, the captured image data of the 360-degree captured images of the long-period exposure image and the short-period exposure image before being combined by the HDR image composition unit 133 is preferably copied and saved in the event recording region 172 upon the occurrence of the event. The sixth embodiment can save the captured image with a smaller blur if an event such as an accident occurs to the vehicle 200.

The vehicle imaging device 100 according to a sixth embodiment may also store the image data of the respective directional images combined by the HDR image composition unit 133 in the ring buffer 171, and copy and save the image data in the event recording region 172 upon the occurrence of an event. The vehicle imaging device 100 according to a sixth embodiment may be configured so as not to record the respective directional images combined by the HDR image composition unit 133 in the ring buffer 171 or the normal recording region 173.

As described above, the imaging unit 12 in the vehicle imaging device 100 according to a sixth embodiment generates a long-period exposure image and a short-period exposure image. The vehicle imaging device 100 according to a sixth embodiment includes the image extraction unit 132 and the HDR image composition unit 133. The image extraction unit 132 generates a front image, a rear image, a right-side image, and a left-side image based on each of the long-period exposure image and the short-period exposure image. The HDR image composition unit 133 combines the front image 20F, the rear image 20B, the right-side image 20R, and the left-side image 20L based on each of the long-period exposure image and the short-period exposure image.

The vehicle imaging device 100 according to a sixth embodiment also includes the ring buffer 171 and the event detection sensor (the acceleration sensor 60). The ring buffer 171 cyclically stores the long-period exposure image and the short-period exposure image. The event detection sensor determines whether any event occurs to the vehicle 200. The controller 16 causes the long-period exposure image and the short-period exposure image having been stored in the ring buffer 171 to be copied and saved in the event recording region 172 when the event detection sensor determines that an event has occurred to the vehicle 200.

The vehicle imaging device 100 according to a sixth embodiment can save the captured image with a smaller blur upon an occurrence of an event such as an accident to the vehicle 200.

Seventh Embodiment

Figure 23:
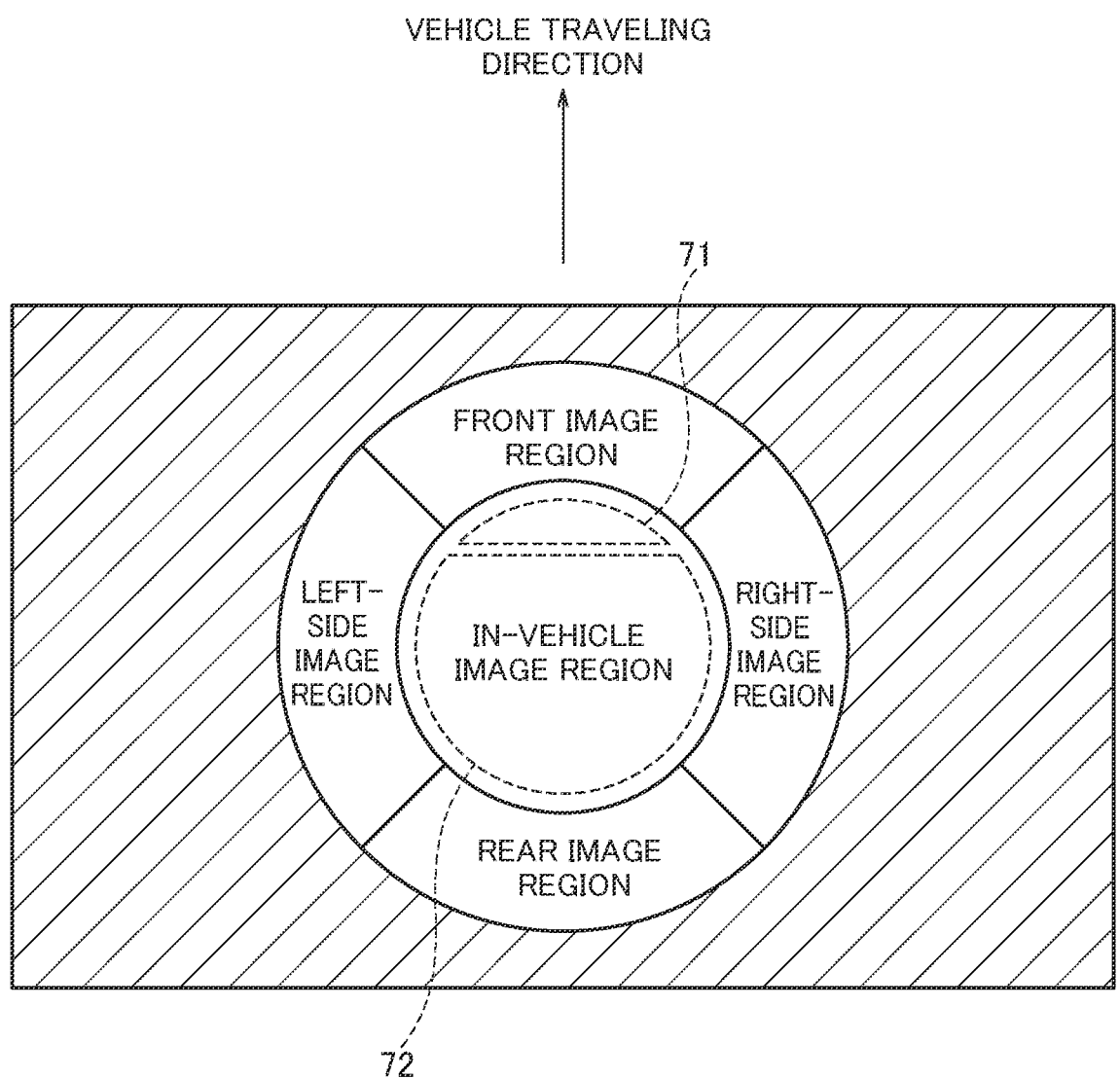
FIG. 23 is a schematic view showing an instrument panel region and a non-instrument panel region defined in an in-vehicle image region according to a seventh embodiment.
Figure 24:
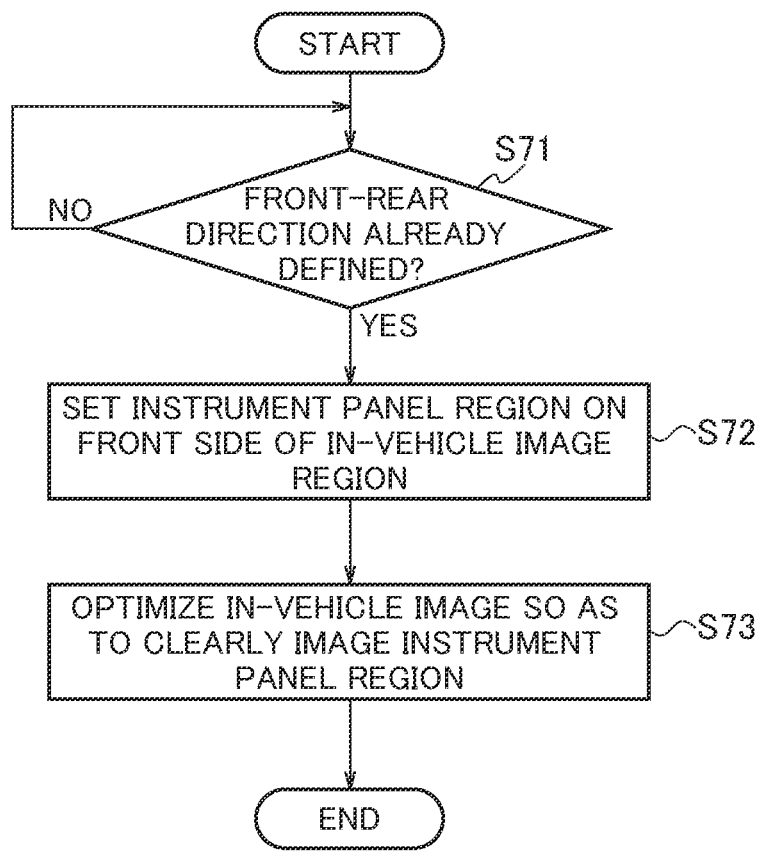
FIG. 24 is a flowchart showing a process of processing executed in a seventh embodiment.

A seventh embodiment provides a vehicle imaging device 100 that can generate an accurate in-vehicle image. FIG. 23 is a view illustrating a 360-degree captured image generated by the imaging unit 12 in a state in which the direction of the front image 20F is correctly adjusted to the forward direction of the vehicle 200 through the processing described with reference to FIG. 8 and FIG. 9. The in-vehicle image region includes an instrument panel including measuring instruments. The image around the instrument panel is an essential part in the in-vehicle image. The vehicle imaging device 100 according to a seventh embodiment executes the processing as shown in FIG. 24.

The controller 16 determines whether the front-rear direction of the vehicle imaging device 100 (the vehicle 200) has been defined, and whether the directions of the front image 20F and the rear image 20B have been adjusted in step S71. When the front-rear direction has not been defined yet in step S71 (NO), the controller 16 repeats the processing in step S71 until the processing as described with reference to FIG. 8 and FIG. 9 according to a first embodiment is finished.

When the front-rear direction is determined to have been defined in step S71 (YES), the controller 16 defines an instrument panel region 71 on the front side of the in-vehicle image region in step S72, as illustrated in FIG. 23. The controller 16 can define a predetermined region on the front side of the in-vehicle image region as the instrument panel region 71. The image analyzer 14 may detect the instrument panel through image analysis, so that the controller 16 defines the instrument panel region 71 in accordance with the detection result obtained by the image analyzer 14.

The controller 16 functions as a region setting unit that defines the instrument panel region 71 and a non-instrument panel region 72 other than the instrument panel region 71 in the in-vehicle image region in each of the long-period exposure image and the short-period exposure image.

The controller 16 optimizes the in-vehicle image so as to clearly image the instrument panel region 71 in step S73. In particular, the controller 16 controls the imaging unit 12 to optimize an exposure time when generating the long-period exposure image and the short-period exposure image so as to avoid causing blown-out highlights upon capturing the image having high brightness displayed with an LED or the like in the instrument panel region 71.

A first exposure time upon generating the long-period exposure image and a second exposure time upon generating the short-period exposure image are determined as follows. The first and second exposure times are defined between a longest time and a shortest time, and are each set to a time between the longest time and the shortest time depending on the brightness of the image.

Figure 25:
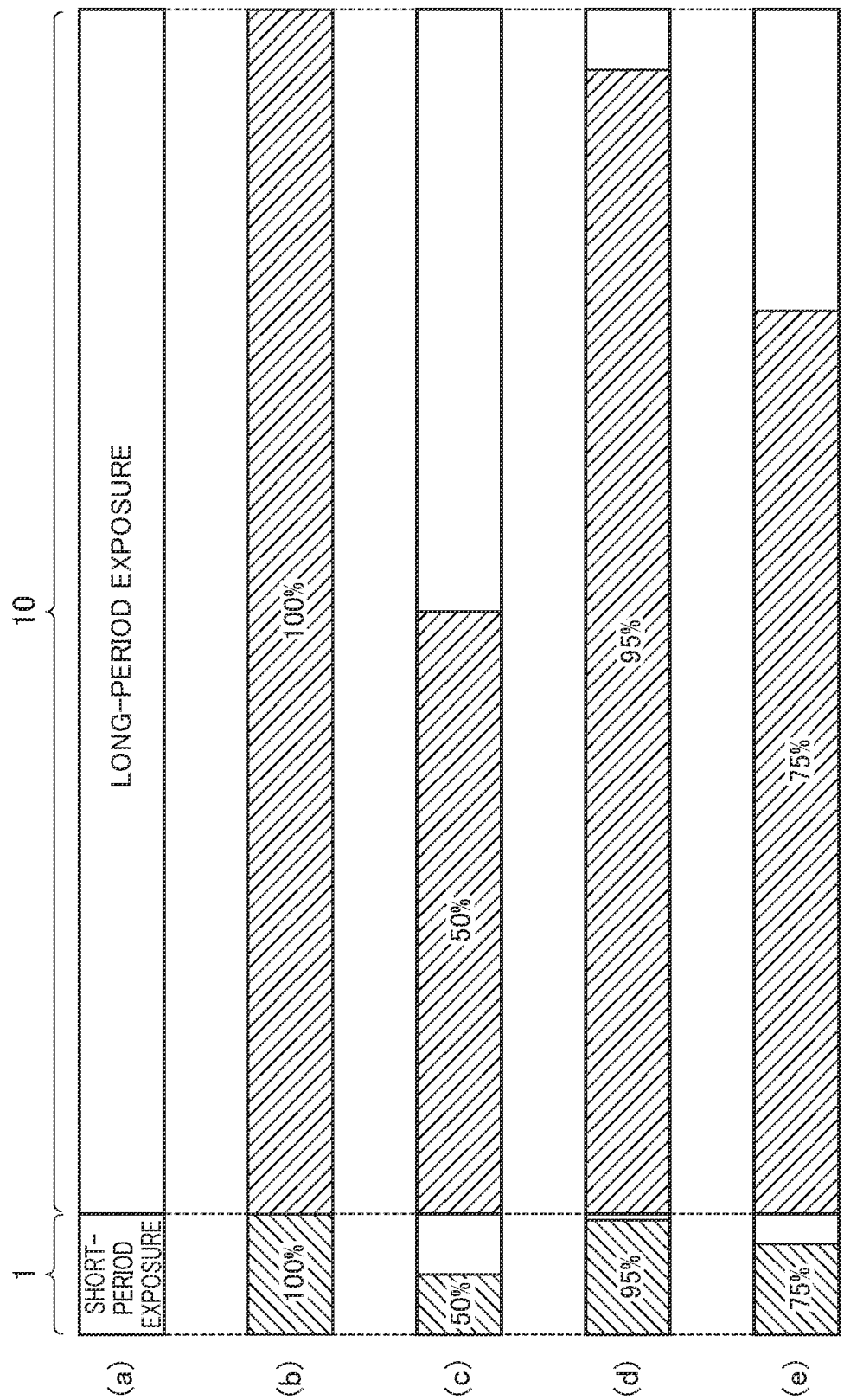
FIG. 25 is a schematic view showing a first exposure time when generating a long-period exposure image and a second exposure time when generating a short-period exposure image.

A ratio of the first exposure time of the long-period exposure to the second exposure time of the short-period exposure is presumed to be 10:1, as illustrated in (a) in FIG. 25. A case is presumed in which the compartment of the vehicle 200 is dark, and a proportion of the optimum exposure time in the non-instrument panel region 72 is 100% of the longest time, as illustrated in (b) in FIG. 25. A case is presumed in which the instrument panel region 71 is brighter than the non-instrument panel region 72, and a proportion of the optimum exposure time in the instrument panel region 71 is 50% of the longest time, as illustrated in (c) in FIG. 25.

When a single image region includes a bright region and a dark region, a proportion of an optimum exposure time is typically determined in view of an area of the bright region and an area of the dark region. When a ratio of the areas between the instrument panel region 71 and the non-instrument panel region 72 is presumed to be 1:9, the controller 16 in this case determines that the proportion of the optimum exposure time in each of the first exposure time of the long-period exposure and the second exposure time of the short-period exposure is 95%, as illustrated in (d) in FIG. 25, according to a calculation formula as given by: $9/10 \times 100\% + 1/10 \times 50\% = 95\%$. However, the instrument panel region 71 would cause blown-out highlights if the proportion of the optimum exposure time is determined to be 95%.

The controller 16 thus desirably determines the proportion of the optimum exposure time of both the instrument panel region 71 and the non-instrument panel region 72 in accordance with the proportion of the optimum exposure time in the instrument panel region 71 that is 50% and the proportion of the optimum exposure time in the non-instrument panel region 72 that is 100%. The proportion of the optimum exposure time in the instrument panel region 71 is referred to as a first optimum exposure-time proportion, and the proportion of the optimum exposure time in the non-instrument panel region 72 is referred to as a second optimum exposure-time proportion. The controller 16 sets a third optimum exposure-time proportion that is a proportion of an exposure time common to the instrument panel region 71 and the non-instrument panel region 71.

The controller 16 in this case does no take account of the ratio of the areas between the instrument panel region 71 and the non-instrument panel region 71. As illustrated in (e) in FIG. 25, the controller 16 sets 75C which is the average of 50% and 100% as the third optimum exposure-time proportion, for example. Since the exposure time in the instrument panel region 71 is decreased from 95% to 75%, a probability of occurrence of blown-out highlights can be decreased.

While the present embodiment is illustrated above with the case in which the non-instrument panel region 72 is darker and the instrument panel region 71 is brighter, an upper limit of the proportion of the exposure time in the instrument panel region 71 is desirably set as follows, depending on the relationship of brightness between the instrument panel region 71 and the non-instrument panel region 72.

A shortest exposure-time proportion under the condition in which the image in the instrument panel region 71 has no blocked-up shadows is referred to below as T71S, and a longest exposure-time proportion under the condition in which the image in the instrument panel region 71 has no blown-out highlights is referred to below as T71L. An optimum exposure-time proportion in the instrument panel region 71 is referred to below as T71O. An optimum exposure-time proportion in the non-instrument panel region 72 is referred to below as T72O. The controller 16 can make a decision on the condition of whether blocked-up shadows are caused in the image and the condition of whether blown-out highlights are caused in the image. The controller 16 can calculate the longest exposure time and the optimum exposure time that do not lead to blocked-up shadows or blown-out highlights in accordance with the brightness of the image, so as to determine the respective exposure-time proportions.

When the compartment is dark, and the instrument panel region 71 is brighter than the non-instrument panel region 72, the exposure-time proportions T71S, T71L, T71O, and T72O are respectively 10%, 50%, 30%, and 80%, for example. When the longest exposure-time proportion T71L and the optimum exposure-time proportion T72O fulfill the relation of T71L<T72O, the controller 16 desirably controls the imaging unit 12 to set the maximum value of the exposure-time proportion as the longest exposure-time proportion T71L in the instrument panel region 71.

When the compartment is bright due to the irradiation with sunlight, and the non-instrument panel region 72 is brighter than the instrument panel region 71, the exposure-time proportions T71S, T71L, T71O, and T72O are respectively 60%, 80%, 70%, and 20%, for example. When the shortest exposure-time proportion T71S and the optimum exposure-time proportion T72O fulfill the relation of T72O<T71S, the controller 16 desirably controls the imaging unit 12 to set the minimum value of the exposure-time proportion as the shortest exposure-time proportion T71S in the instrument panel region 71.

Controlling the imaging unit 12 by the controller 16 as described above avoids blown-out highlights caused in the instrument panel region 71 when imaged, and leads the non-instrument panel region 72 to be imaged in a bright state.

The vehicle imaging device 100 according a seventh embodiment thus can generate the accurate in-vehicle image.

At least the image processing unit 13, the image analyzer 14, and the controller 16 included in the configurations as illustrated in FIG. 2 and FIG. 21 may be implemented by a computer or a central processing unit (CPU) of the computer installed in the vehicle imaging device 100, and a computer program (an image processing program) executed by the CPU.

A first embodiment may be an image processing program for causing the CPU to execute the processing as shown in FIG. 8 and FIG. 9. The second embodiment may be an image processing program for causing the CPU to execute the processing as shown in FIG. 13. The third embodiment may be an image processing program for executing the CPU to execute the processing as shown in FIG. 15. The fourth embodiment may be an image processing program for causing the CPU to execute the processing as shown in FIG. 18A and FIG. 18B. The fifth embodiment may be an image processing program for causing the CPU to execute the processing as shown in FIG. 20A and FIG. 20B. The sixth embodiment may be an image processing program for causing the CPU to execute the processing as shown in FIG. 22. The seventh embodiment may be an image processing program for causing the CPU to execute the processing as shown in FIG. 24. The respective image processing programs are stored in a non-transitory storage medium.

The present invention is not limited to the above-described first to seventh embodiments, and various modifications can be made within a range without departing from the scope of the present invention. First to seventh embodiments may be combined as appropriate within a range without being in consistent with each other. The proper use of hardware and software are optional.

What is claimed is:

1. A vehicle imaging device provided in a vehicle, the device comprising:
   a motion vector detector configured to detect motion vectors of a captured image of a subject imaged through 360 degrees by an imaging unit to which a light enters via a fisheye lens;
   a front-rear-right-left determination unit configured to determine front and rear sides and right and left sides of the vehicle in accordance with the captured image and determine positions of at least a front image region and a rear image region in a circumferential direction in the captured image;
   an image rotation unit configured to rotate the captured image about a first vanishing point of a plurality of radially diverging motion vectors among the motion vectors detected by the motion vector detector immediately after the vehicle starts moving, and adjust the positions of the front image region and the rear image region in the circumferential direction; and
   a measurement unit configured to measure a first generation time of the first vanishing point generated in the front image region and a second generation time of a second vanishing point of a plurality of converging motion vectors generated in the front image region within a predetermined period of time in a state in which the image rotation unit adjusts the positions of the front image region and the rear image region in the circumferential direction,
   wherein the image rotation unit is configured to keep the positions of the front image region and the rear image region in the circumferential direction when the first generation time measured by the measurement unit is longer than the second generation time, and rotate the captured image to reverse the front image region and the rear image region when the first generation time is not longer than the second generation time,
   the vehicle imaging device further comprises an image extraction unit configured to extract regional images of the front image region and the rear image region kept or reversed by the image rotation unit in the captured image to generate a front image and a rear image.

2. The vehicle imaging device according to claim 1, wherein the image rotation unit rotates the captured image about the first vanishing pint generated in the regional image newly defined as a front image region after rotating the captured image to reverse the front image region and the rear image region, and adjusts the positions of the front image region and the rear image region in the circumferential direction.

3. The vehicle imaging device according to claim 1, wherein the image extraction unit corrects a distortion of the extracted front image region and rear image region caused by the fisheye lens and generates the front image and the rear image so as to approximate the front side and the rear side of the vehicle that a person is presumed to see.

4. The vehicle imaging device according to claim 1, wherein:
   the front-rear-right-left determination unit determines positions of a right-side image region and a left-side image region in the circumferential direction in the captured image in addition to the front image region and the rear image region;
   the image rotation unit adjusts the positions of the right-side image region and the left-side image region in the circumferential direction in addition to the front image region and the rear image region; and
   the image extraction unit extracts regional images of the right-side image region and the left-side image region in the captured image in addition to the front image region and the rear image region to generate a right-side image and a left-side image.

5. The vehicle imaging device according to claim 1, wherein:
   the imaging unit generates a long-period exposure image obtained such that a subject is imaged through 360 degrees for a first exposure time, and a short-period exposure image obtained such that the subject is imaged through 360 degrees for a second exposure time shorter than the first exposure time with the light incident via the fisheye lens;
   the motion vector detector detects motion vectors of the long-period exposure image or the short-period exposure image;
   the image extraction unit extracts regional images of a right-side image region and a left-side image region of the vehicle in each of the long-period exposure image and the short-period exposure image, and generates a right-side image and a left-side image based on the long-period exposure image and a right-side image and a left-side image based on the short-period exposure image; and
   the vehicle imaging device further comprises a high-dynamic-range image composition unit configured to refer to the motion vectors detected in the right-side image region or the left-side image region by the motion vector detector to combine the right-side image or the left-side image generated in accordance with the long-period exposure image with the right-side image or the left-side image generated in accordance with the short-period exposure image so as to correct a blur of the image of the subject derived from a difference in imaging timing between the subject included in the right-side image or the left-side image based on the long-period exposure image and the subject included in the right-side image or the left-side image based on the short-period exposure image.

6. The vehicle imaging device according to claim 5, wherein:

the image extraction unit extracts regional images of a front image region and a rear image region of the vehicle in each of the long-period exposure image and the short-period exposure image in addition to the right-side image region and the left-side image region to generate a front image and a rear image; and the high-dynamic-range image composition unit combines the front image and the rear image generated in accordance with the long-period exposure image with the front image and the rear image generated in accordance with the short-period exposure image without referring to the motion vectors detected by the motion vector detector.

7. The vehicle imaging device according to claim 5, wherein, when the motion vector detector detects a plurality of motion vectors in different directions in the right-side image region or the left-side image region, the high-dynamic-range image composition unit refers to the motion vector of the subject included in the right-side image or the left-side image and determined as a correction target in accordance with a correction mode preliminarily set, and combines the right-side image or the left-side image generated in accordance with the long-period exposure image with the right-side image or the left-side image generated in accordance with the short-period exposure image so as to correct a blur of the image of the subject as the correction target.

8. The vehicle imaging device according to claim 7, wherein:

the plurality of motion vectors in different directions are a first motion vector in a rearward direction of the vehicle and a second motion vector in a forward direction of the vehicle;

when the correction mode corrects the subject as the correction target relatively shifting in the rearward direction of the vehicle, the high-dynamic-range image composition unit refers to the first motion vector to combine the right-side image or the left-side image generated in accordance with the long-period exposure image with the right-side image or the left-side image generated in accordance with the short-period exposure image; and when the correction mode corrects the subject as the correction target relatively shifting in the forward direction of the vehicle, the high-dynamic-range image composition unit refers to the second motion vector to combine the right-side image or the left-side image generated in accordance with the long-period exposure image with the right-side image or the left-side image generated in accordance with the short-period exposure image.

9. The vehicle imaging device according to claim 8, wherein, when a plurality of subjects are present in the right-side image or the left-side image, and the correction mode corrects the subject as the correction target closer to the vehicle, the high-dynamic-range image composition unit refers to the first motion vector or the second motion vector corresponding to a direction in which the subject closer to the vehicle is shifting, and combines the right-side image or the left-side image generated in accordance with the long-period exposure image with the right-side image or the left-side image generated in accordance with the short-period exposure image.

10. The vehicle imaging device according to claim 8, wherein, when a first subject relatively shifting in the rearward direction of the vehicle and a second subject relatively shifting in the forward direction of the vehicle are present in the right-side image or the left-side image, and the correction mode corrects the subject as the correction target determined in accordance with a proportion of an area of the second subject in the right-side image or the left-side image, the high-dynamic-range image composition unit refers to the first motion vector when the proportion of the area of the second subject is not a predetermined proportion or greater in the right-side image or the left-side image, and combines the right-side image or the left-side image generated in accordance with the long-period exposure image with the right-side image or the left-side image generated in accordance with the short-period exposure image, and the high-dynamic-range image composition unit refers to the second motion vector when the proportion of the area of the second subject is the predetermined proportion or greater in the right-side image or the left-side image, and combines the right-side image or the left-side image generated in accordance with the long-period exposure image with the right-side image or the left-side image generated in accordance with the short-period exposure image.

11. The vehicle imaging device according to claim 1, wherein:

the imaging unit generates a long-period exposure image obtained such that a subject is imaged through 360 degrees for a first exposure time, and a short-period exposure image obtained such that the subject is imaged through 360 degrees for a second exposure time shorter than the first exposure time with the light incident via the fisheye lens;

the front-rear-right-left determination unit determines the front and rear sides and the right and left sides of the vehicle in accordance with the long-period exposure image and the short-period exposure image, and determines positions of a front image region, a rear image region, a right-side image region, and a left-side image region in the circumferential direction in each of the long-period exposure image and the short-period exposure image;

the image extraction unit extracts regional images of the front image region, the rear image region, the right-side image region, and the left-side image region in each of the long-period exposure image and the short-period exposure image, and generates directional images of a front image, a rear image, a right-side image, and a left-side image;

the vehicle imaging device further comprises a high-dynamic-range image composition unit configured to combine the front image, the rear image, the right-side image, and the left-side image based on the long-period exposure image generated by the image extraction unit with the front image, the rear image, the right-side image, and the left-side image based on the short-period exposure image generated by the image extraction unit, and a sunlight incident-direction determination unit configured to determine an incident direction of sunlight entering the vehicle imaging device; and the high-dynamic-range image composition unit sets a ratio of the directional image based on the long-period exposure image chosen from the front image, the rear image, the right-side image, and the left-side image in accordance with the incident direction of the sunlight determined by the sunlight incident-direction determination unit to be greater than a ratio of the other directional images based on the long-period exposure image not chosen.

12. The vehicle imaging device according to claim 11, wherein:
the sunlight incident-direction determination unit divides a 360-degree direction imaged by the vehicle imaging device into a plurality of directions including at least a front direction, a rear direction, a right direction, and a left direction, and determines which is the incident direction of the sunlight;
the high-dynamic-range image composition unit
increases the ratio of the front image based on the long-period exposure image when the incident direction of the sunlight is the front direction;
increases the ratio of the rear image based on the long-period exposure image when the incident direction of the sunlight is the rear direction;
increases the ratio of the right-side image based on the long-period exposure image when the incident direction of the sunlight is the right direction; and
increases the ratio of the left-side image based on the long-period exposure image when the incident direction of the sunlight is the left direction.

13. The vehicle imaging device according to claim 12, wherein:
the sunlight incident-direction determination unit divides the 360-degree direction imaged by the vehicle imaging device into a plurality of directions including a front-right direction, a rear-right direction, a rear-left direction, and a front-left direction, in addition to the front direction, the rear direction, the right direction, and the left direction, and determines which is the incident direction of the sunlight;
the high-dynamic-range image composition unit
increases the ratio of each of the front image and the right-side image based on the long-period exposure image when the incident direction of the sunlight is the front-right direction;
increases the ratio of each of the rear image and the right-side image based on the long-period exposure image when the incident direction of the sunlight is the rear-right direction;
increases the ratio of each of the rear image and the left-side image based on the long-period exposure image when the incident direction of the sunlight is the rear-left direction; and
increases the ratio of each of the front image and the left-side image based on the long-period exposure image when the incident direction of the sunlight is the front-left direction.

14. The vehicle imaging device according to claim 1, wherein:
the imaging unit generates a long-period exposure image obtained such that a subject is imaged through 360 degrees for a first exposure time, and a short-period exposure image obtained such that the subject is imaged through 360 degrees for a second exposure time shorter than the first exposure time with the light incident via the fisheye lens;
the front-rear-right-left determination unit determines the front and rear sides and the right and left sides of the vehicle in accordance with the long-period exposure image and the short-period exposure image, and determines positions of a front image region, a rear image region, a right-side image region, and a left-side image region in the circumferential direction in each of the long-period exposure image and the short-period exposure image;
the image extraction unit extracts regional images of the front image region, the rear image region, the right-side image region, and the left-side image region in each of the long-period exposure image and the short-period exposure image, and generates directional images of a front image, a rear image, a right-side image, and a left-side image;
the vehicle imaging device further comprises
a high-dynamic-range image composition unit configured to combine the directional images of the front image, the rear image, the right-side image, and the left-side image based on the long-period exposure image generated by the image extraction unit with the directional images of the front image, the rear image, the right-side image, and the left-side image based on the short-period exposure image generated by the image extraction unit, and
a tunnel travelling determination unit configured to determine a state of the traveling vehicle when coming closer to a tunnel, entering the tunnel and traveling in the tunnel, and coming out of the tunnel; and
the high-dynamic-range image composition unit adjusts a ratio of the directional image based on the long-period exposure image or a ratio of the directional image based on the short-period exposure image chosen from the front image, the rear image, the right-side image, and the left-side image in accordance with a position of the vehicle before entering the tunnel, during traveling in the tunnel, and after coming out of the tunnel according to a determination made by the tunnel travelling determination unit.

15. The vehicle imaging device according to claim 14, wherein the high-dynamic-range image composition unit increases the ratio of the front image based on the long-period exposure image when the tunnel travelling determination unit determines that the vehicle is coming closer to the tunnel and an image inside the tunnel is a predetermined proportion or greater in the front image.

16. The vehicle imaging device according to claim 14, wherein the high-dynamic-range image composition unit increases the ratio of each of the right-side image and the left-side image based on the long-period exposure image when the tunnel travelling determination unit determines that the vehicle enters tunnel.

17. The vehicle imaging device according to claim 14, wherein the high-dynamic-range image composition unit increases the ratio of the rear image based on the long-period exposure image when the tunnel travelling determination unit determines that an image excluding the tunnel toward an entrance of the tunnel after the vehicle enters the tunnel is a predetermined proportion or less in the rear image.

18. The vehicle imaging device according to claim 14, wherein the high-dynamic-range image composition unit decreases the ratio of the front image based on the long-period exposure image when the tunnel travelling determination unit determines that the vehicle is coming closer to an exit of the tunnel and an image excluding the tunnel toward the exit of the tunnel is a predetermined proportion or greater in the front image.

19. The vehicle imaging device according to claim 14, wherein the high-dynamic-range image composition unit decreases the ratio of each of the right-side image and the left-side image based on the long-period exposure image when the tunnel travelling determination unit determines that the vehicle comes out of the tunnel.

20. The vehicle imaging device according to claim 1, wherein:
the imaging unit generates a long-period exposure image obtained such that a subject is imaged through 360 degrees for a first exposure time, and a short-period exposure image obtained such that the subject is imaged through 360 degrees for a second exposure time shorter than the first exposure time with the light incident via the fisheye lens;
the image extraction unit extracts regional images of a front image region, a rear image region, a right-side image region, and a left-side image region of the vehicle in each of the long-period exposure image and the short-period exposure image, and generates directional images of a front image, a rear image, a right-side image, and a left-side image based on the long-period exposure image and directional images of a front image, a rear image, a right-side image, and a left-side image based on the short-period exposure image; and
the vehicle imaging device further comprises
a high-dynamic-range image composition unit configured to combine the respective directional images based on the long-period exposure image with the respective directional images based on the short-period exposure image,
a ring buffer configured to cyclically store the long-period exposure image and the short-period exposure image,
an event detection sensor configured to determine whether an event occurs to the vehicle, and
a controller configured to control to copy and save the long-period exposure image and the short-period exposure image stored in the ring buffer to an event recording region when the event detection sensor determines that the event occurs to the vehicle.

21. The vehicle imaging device according to claim 20, wherein the controller controls to record a combined image of the respective directional images based on the long-period exposure image and the respective directional images based on the short-period exposure image generated by the high-dynamic-range image composition unit in a normal recording region without recording in the ring buffer.

22. The vehicle imaging device according to claim 20, wherein the controller is configured to:
store a combined image of the respective directional images based on the long-period exposure image and the respective directional images based on the short-period exposure image generated by the high-dynamic-range image composition unit in the ring buffer; and
control to copy and save the combined image stored in the ring buffer to the event recording region when the event detection sensor determines that the event occurs to the vehicle.

23. The vehicle imaging device according to claim 1, wherein:
the imaging unit generates a long-period exposure image obtained such that a subject is imaged through 360 degrees for a first exposure time, and a short-period exposure image obtained such that the subject is imaged through 360 degrees for a second exposure time shorter than the first exposure time with the light incident via the fisheye lens; and
the vehicle imaging device further comprises a high-dynamic-range image composition unit configured to combine the long-period exposure image with the short-period exposure image in a predetermined ratio,
a region setting unit configured to define an instrument panel region including an instrument panel of the vehicle and a non-instrument panel region other than the instrument panel region in an in-vehicle image region of the vehicle in each of the long-period exposure image and the short-period exposure image, and
a controller configured to, when a proportion of an optimum exposure time corresponding to a brightness of an image in the instrument panel region to a longest exposure time of each of the long-period exposure image and the short-period exposure image is defined as a first optimum exposure-time proportion, and a proportion of an optimum exposure time corresponding to a brightness of an image in the non-instrument panel region to the longest exposure time of each of the long-period exposure image and the short-period exposure image is defined as a second optimum exposure-time proportion, control the imaging unit to set a third optimum exposure-time proportion common to the instrument panel region and the non-instrument panel region in accordance with the first optimum exposure-time proportion and the second optimum exposure-time proportion without taking account of a ratio of areas between the instrument panel region and the non-instrument panel region.

24. The vehicle imaging device according to claim 23, wherein the controller is configured to:
determine whether an image has blown-out highlights; and
when the second optimum exposure-time proportion is greater than a longest exposure-time proportion under a condition in which the image in the instrument panel region has no blown-out highlights, control the imaging unit to set a maximum value of an exposure-time proportion as the longest exposure-time proportion in the instrument panel region.

25. The vehicle imaging device according to claim 23, wherein the controller is configured to:
determine whether an image has blocked-up shadows; and
when a shortest exposure-time proportion under a condition in which the image in the instrument panel region has no blocked-up shadows is greater than the second optimum exposure-time proportion, control the imaging unit to set a minimum value of an exposure-time proportion as the shortest exposure-time proportion in the instrument panel region.

26. An image processing method for a vehicle imaging device provided in a vehicle, the method comprising:
detecting motion vectors of a captured image of a subject imaged through 360 degrees by an imaging unit to which a light enters via a fisheye lens;
determining front and rear sides and right and left sides of the vehicle in accordance with the captured image and determining positions of at least a front image region and a rear image region in a circumferential direction in the captured image;
rotating the captured image about a first vanishing point of a plurality of radially diverging motion vectors among the motion vectors detected immediately after the vehicle starts moving, and adjusting the positions of the front image region and the rear image region in the circumferential direction;

measuring a first generation time of the first vanishing point generated in the front image region and a second generation time of a second vanishing point of a plurality of converging motion vectors generated in the front image region within a predetermined period of time in a state of adjusting the positions of the front image region and the rear image region in the circumferential direction;

keeping the positions of the front image region and the rear image region in the circumferential direction when the first generation time measured is longer than the second generation time;

rotating the captured image to reverse the front image region and the rear image region when the first generation time measured is not longer than the second generation time; and extracting regional images of the front image region and the rear image region kept when the first generation time measured is longer than the second generation time or reversed when the first generation time measured is not longer than the second generation time in the captured image to generate a front image and a rear image.

27. An image processing program stored in a non-transitory storage medium causing a computer installed in a vehicle imaging device provided in a vehicle to execute the steps of:

detecting motion vectors of a captured image of a subject imaged through 360 degrees by an imaging unit to which a light enters via a fisheye lens;

determining front and rear sides and right and left sides of the vehicle in accordance with the captured image and determining positions of at least a front image region and a rear image region in a circumferential direction in the captured image;

rotating the captured image about a first vanishing point of a plurality of radially diverging motion vectors among the motion vectors detected immediately after the vehicle starts moving, and adjusting the positions of the front image region and the rear image region in the circumferential direction;

measuring a first generation time of the first vanishing point generated in the front image region and a second generation time of a second vanishing point of a plurality of converging motion vectors generated in the front image region within a predetermined period of time in a state of adjusting the positions of the front image region and the rear image region in the circumferential direction;

keeping the positions of the front image region and the rear image region in the circumferential direction when the first generation time measured is longer than the second generation time;

rotating the captured image to reverse the front image region and the rear image region when the first generation time measured is not longer than the second generation time; and extracting regional images of the front image region and the rear image region kept when the first generation time measured is longer than the second generation time or reversed when the first generation time measured is not longer than the second generation time in the captured image to generate a front image and a rear image.

* * * * *